(12) United States Patent
Marsh et al.

(10) Patent No.: US 11,872,665 B2
(45) Date of Patent: Jan. 16, 2024

(54) INTEGRATED DUST EXTRACTOR AND POWER TOOL

(71) Applicant: MILWAUKEE ELECTRIC TOOL CORPORATION, Brookfield, WI (US)

(72) Inventors: Julia C. Marsh, Milwaukee, WI (US); John Bloom-Edmonds, Menomonie Falls, WI (US); Jeffery D. Spraggon, Milwaukee, WI (US); Andrew Delmar Van Hoorn, Menomonee Falls, WI (US); Allen H. Johnson, III, Houston, TX (US); Amedee Brennan O'Gorman, West Bend, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 17/711,834

(22) Filed: Apr. 1, 2022

(65) Prior Publication Data
US 2022/0314384 A1 Oct. 6, 2022

Related U.S. Application Data

(60) Provisional application No. 63/211,856, filed on Jun. 17, 2021, provisional application No. 63/169,611, filed on Apr. 1, 2021.

(51) Int. Cl.
*B23Q 11/00* (2006.01)
*B25F 5/00* (2006.01)
(Continued)

(52) U.S. Cl.
CPC ...... *B23Q 11/0046* (2013.01); *B01D 46/0043* (2013.01); *B01D 46/46* (2013.01);
(Continued)

(58) Field of Classification Search
CPC .............. B23Q 11/006; B23Q 11/0046; B23Q 11/0071; B25F 5/02
(Continued)

(56) References Cited

U.S. PATENT DOCUMENTS 1,969,318 A 8/1934 Myers
1,983,277 A 12/1934 Emmons
(Continued)

FOREIGN PATENT DOCUMENTS

CN 2917926 Y 7/2004
CN 101733737 A 6/2010
(Continued)

OTHER PUBLICATIONS

International Search Report and Written Opinion for Application No. PCT/US2022/023124 dated Jul. 25, 2022 (10 pages).

*Primary Examiner* — Eyamindae C Jallow
(74) *Attorney, Agent, or Firm* — Michael Best & Friedrich LLP

(57) ABSTRACT

A handheld power tool including a housing, a tool receptacle disposed on a first end of the housing and configured to receive a tool accessory, and a motor positioned within the housing and operatively coupled to the tool receptacle to drive the tool accessory. A dust container is selectively coupled to the housing. A dust tube is coupled to the first end of the housing and in fluid communication with the dust container, wherein the dust tube is movable between an extended position and a retracted position. A fan is positioned within the housing and is operable to generate a suction air flow path through the dust tube and into the dust container, wherein the fan rotatably driven by the motor.

21 Claims, 30 Drawing Sheets

(51) Int. Cl.

| | |
|---|---|
| *H02K 7/14* | (2006.01) |
| *B01D 46/00* | (2022.01) |
| *B01D 46/46* | (2006.01) |
| *B01D 46/68* | (2022.01) |
| *H02K 9/10* | (2006.01) |
| *B25D 17/20* | (2006.01) |

(52) U.S. Cl.
CPC .......... *B01D 46/68* (2022.01); *B23Q 11/0071* (2013.01); *B25F 5/008* (2013.01); *H02K 7/145* (2013.01); *H02K 9/10* (2013.01); *B01D 2273/30* (2013.01); *B25D 17/20* (2013.01)

(58) Field of Classification Search
USPC ..................... 173/75, 77, 197, 198
See application file for complete search history.

(56) References Cited

U.S. PATENT DOCUMENTS

| | | |
|---|---|---|
| 2,122,517 A | 7/1938 | Curtis |
| 2,250,670 A | 7/1941 | Joy |
| 3,339,435 A | 9/1967 | Walter-Helmut |
| 3,511,322 A | 5/1970 | Bixby et al. |
| 3,535,829 A | 10/1970 | Dudek |
| 3,638,737 A | 2/1972 | Moates |
| 4,097,176 A | 6/1978 | Wanner et al. |
| 4,192,390 A | 3/1980 | Wanner et al. |
| 4,209,069 A | 6/1980 | Smith |
| 4,921,375 A | 5/1990 | Famulari |
| 5,006,740 A | 4/1991 | Palm |
| 5,129,467 A | 7/1992 | Watanabe et al. |
| 5,199,220 A | 4/1993 | Steiner et al. |
| 5,688,082 A | 11/1997 | Richardson |
| 5,904,453 A | 5/1999 | Gavia |
| 6,295,953 B1 | 10/2001 | Ohsawa et al. |
| 6,793,568 B2 | 9/2004 | Dotta |
| 6,848,985 B2 | 2/2005 | Lamprecht et al. |
| 7,178,248 B2 | 2/2007 | Richards |
| 7,182,150 B2 | 2/2007 | Grossman |
| 7,235,006 B2 | 6/2007 | Ikeda et al. |
| 7,322,429 B2 | 1/2008 | Kim |
| 7,354,226 B2 | 4/2008 | Britz |
| 7,425,109 B2 | 9/2008 | Simm et al. |
| 7,510,356 B2 | 3/2009 | Colon |
| 7,740,086 B2 | 6/2010 | Bleicher et al. |
| 7,797,794 B2 | 9/2010 | Bleicher et al. |
| 7,901,164 B2 | 3/2011 | Skradski et al. |
| 8,152,602 B2 | 4/2012 | Guth |
| 8,186,453 B2 | 5/2012 | Furusawa et al. |
| 8,337,124 B2 | 12/2012 | Nguyen |
| 8,342,782 B2 | 1/2013 | Nishikawa et al. |
| 8,529,169 B2 | 9/2013 | Nishikawa et al. |
| 8,636,084 B2 | 1/2014 | Ohlendorf |
| 8,800,682 B2 | 8/2014 | Walker |
| 8,967,922 B2 | 3/2015 | Yoshikane et al. |
| 8,978,781 B2 | 3/2015 | Burdick et al. |
| 9,022,702 B2 | 5/2015 | Kasuya et al. |
| 9,296,079 B2 | 3/2016 | Miwa et al. |
| 9,393,658 B2 | 7/2016 | Walker et al. |
| 9,579,762 B2 | 2/2017 | Sullivan |
| 9,956,659 B2 | 5/2018 | Takeuchi et al. |
| 9,981,360 B2 | 5/2018 | Roeck et al. |
| 9,999,967 B2 | 6/2018 | Furusawa et al. |
| 10,005,163 B2 | 6/2018 | Johnson et al. |
| 10,238,252 B2 | 3/2019 | Buczek |
| 10,328,541 B2 | 6/2019 | Wong et al. |
| 10,357,862 B2 | 7/2019 | Arthur |
| 10,507,557 B2 | 12/2019 | Meiser et al. |
| 10,596,693 B2 | 3/2020 | Vasudeva |
| 10,603,753 B2 | 3/2020 | Lauer |
| 10,639,758 B2 | 5/2020 | Le et al. |
| 10,759,013 B2 | 9/2020 | Arthur et al. |
| 10,780,541 B2 | 9/2020 | Arthur et al. |
| 10,857,643 B2 | 12/2020 | Cacchiotti et al. |
| 10,864,609 B2 | 12/2020 | Mori et al. |
| 10,882,153 B2 | 1/2021 | Arthur et al. |
| 2002/0154960 A1 | 10/2002 | Lin |
| 2008/0202781 A1 | 8/2008 | Nishikawa et al. |
| 2011/0226502 A1* | 9/2011 | Bito .................. B23Q 11/0046 173/171 |
| 2011/0266015 A1 | 11/2011 | Ohlendorf et al. |
| 2011/0308830 A1* | 12/2011 | Furusawa .............. B25F 5/003 173/198 |
| 2012/0043101 A1* | 2/2012 | Ishikawa .................. B28D 7/02 173/75 |
| 2012/0063856 A1 | 3/2012 | Miwa et al. |
| 2012/0298391 A1* | 11/2012 | Kakiuchi ........... B23Q 11/0046 173/217 |
| 2012/0318553 A1* | 12/2012 | Chen .................. B23Q 11/0046 173/198 |
| 2013/0094915 A1 | 4/2013 | Chen |
| 2016/0001433 A1 | 1/2016 | Furusawa et al. |
| 2017/0066095 A1 | 3/2017 | Chen |
| 2018/0085873 A1* | 3/2018 | Rompel ............... B23D 59/006 |
| 2019/0091819 A1* | 3/2019 | Mori .................. B23Q 11/0071 |
| 2019/0168348 A1 | 6/2019 | Wong et al. |
| 2019/0193225 A1* | 6/2019 | Beeson ............... B23Q 11/0071 |
| 2019/0223669 A1* | 7/2019 | Lauer ........................ B08B 9/08 |
| 2019/0381618 A1 | 12/2019 | Furusawa |
| 2020/0077852 A1* | 3/2020 | Bayha .................. A47L 7/0095 |
| 2020/0078922 A1 | 3/2020 | Petrovic |
| 2020/0156199 A1* | 5/2020 | Richards .................... A47L 5/24 |
| 2020/0305665 A1 | 10/2020 | Yoshikane et al. |
| 2020/0361047 A1 | 11/2020 | Arthur et al. |
| 2021/0016405 A1 | 1/2021 | Mori et al. |
| 2021/0101289 A1 | 4/2021 | Naderer |
| 2021/0178568 A1* | 6/2021 | Machida .................... B25F 5/00 |
| 2021/0362292 A1 | 11/2021 | Naderer |
| 2022/0111476 A1* | 4/2022 | Beeson ............... B23Q 11/0046 |

FOREIGN PATENT DOCUMENTS

| | | |
|---|---|---|
| CN | 201669686 U | 12/2010 |
| CN | 102601416 A | 7/2012 |
| CN | 101130242 B | 8/2012 |
| CN | 103085036 A | 5/2013 |
| CN | 203863532 U | 10/2014 |
| CN | 203875855 U | 10/2014 |
| CN | 104249171 A | 12/2014 |
| CN | 105058328 A | 11/2015 |
| CN | 104015127 B | 5/2016 |
| CN | 104029127 B | 8/2016 |
| CN | 205799418 U | 12/2016 |
| CN | 106625438 A | 5/2017 |
| CN | 107214595 A | 9/2017 |
| CN | 107520815 A | 12/2017 |
| CN | 108161844 A | 6/2018 |
| CN | 108340321 A | 7/2018 |
| CN | 207997288 U | 10/2018 |
| CN | 109571374 A | 4/2019 |
| CN | 109909955 A | 6/2019 |
| CN | 208992640 U | 6/2019 |
| CN | 209078678 U | 7/2019 |
| CN | 110695411 A | 1/2020 |
| CN | 112208001 A | 1/2021 |
| CN | 213165204 U | 5/2021 |
| CN | 213673417 U | 7/2021 |
| CN | 215395050 U | 1/2022 |
| DE | 2240346 A1 | 2/1974 |
| DE | 2453791 A1 | 5/1976 |
| DE | 2606122 A1 | 8/1977 |
| DE | 3113913 A1 | 10/1982 |
| DE | 8234786 U1 | 1/1984 |
| DE | 3229183 A1 | 2/1984 |
| DE | 2940362 C2 | 11/1985 |
| DE | 3605204 A1 | 8/1987 |
| DE | 4139603 A1 | 6/1993 |
| DE | 9418453 U1 | 1/1995 |
| DE | 4342484 A1 | 4/1995 |
| DE | 19702053 A1 | 7/1998 |
| DE | 10223072 A1 | 5/2004 |
| DE | 19603528 B4 | 1/2005 |

(56) References Cited

FOREIGN PATENT DOCUMENTS

| | | |
|---|---|---|
| DE | 102004045625 A1 | 4/2006 |
| DE | 202007010514 U1 | 10/2007 |
| DE | 102006039969 A1 | 2/2008 |
| DE | 102007019704 A1 | 6/2011 |
| DE | 102009054969 A1 | 6/2011 |
| DE | 102012200543 A1 | 7/2013 |
| DE | 102019102360 A1 | 8/2019 |
| EP | 0296711 A1 | 12/1988 |
| EP | 0558994 B1 | 11/1995 |
| EP | 0548782 B1 | 4/1997 |
| EP | 0855244 B1 | 1/2003 |
| EP | 1714735 B1 | 10/2007 |
| EP | 1627705 B1 | 12/2007 |
| EP | 1923173 B1 | 5/2009 |
| EP | 1842612 B1 | 3/2010 |
| EP | 2253430 B1 | 11/2011 |
| EP | 2196284 B1 | 1/2012 |
| EP | 2390053 B1 | 7/2015 |
| WO | WO9520440 A1 | 8/1995 |
| WO | WO2019104603 A1 | 6/2001 |
| WO | WO2005025792 A1 | 3/2005 |
| WO | WO2010035395 A1 | 4/2010 |
| WO | WO2013161444 A1 | 10/2013 |
| WO | WO2014067497 A2 | 5/2014 |

\* cited by examiner

INTEGRATED DUST EXTRACTOR AND POWER TOOL

CROSS-REFERENCE TO RELATED APPLICATIONS

This application claims priority to U.S. Provisional Patent Application No. 63/169,611, filed on Apr. 1, 2021, and to U.S. Provisional Patent Application No. 63/211,856, filed on Jun. 17, 2021, the entire content of each of which is incorporated herein by reference.

FIELD OF THE INVENTION

The present disclosure relates to power tools, and more particularly to dust collection assemblies for use with power tools.

BACKGROUND

Dust collection assemblies are typically used in tandem with hand-held drilling tools, such as rotary hammers, to collect dust and other debris during a drilling operation preventing dust and other debris from accumulating at a worksite. Such dust collection assemblies may be attached to a rotary hammer to position a suction inlet of the collector proximate a drill bit attached to the rotary hammer. Such dust collection assemblies may also include an on-board dust container in which dust and other debris is accumulated. Such dust containers are often removable from the dust collection assembly to facilitate disposal of the accumulated dust and debris.

SUMMARY

The present disclosure provides, in one aspect, a handheld power tool comprising a housing, a tool receptacle disposed on a first end of the housing and configured to receive a tool accessory, a drive assembly positioned within the housing and configured to drive the tool accessory, a motor positioned within the housing and operatively coupled to the drive assembly to drive the drive assembly, a dust container selectively coupled to the housing, a suction pipe coupled to the first end of the housing and in fluid communication with the dust container, the suction pipe movable between a first position and a second position, and a suction fan positioned within the housing and operable to generate an air flow path through the suction pipe and into the dust container.

The present disclosure provides a handheld power tool including a housing, a tool receptacle disposed on a first end of the housing and configured to receive a tool accessory, and a motor positioned within the housing and operatively coupled to the tool receptacle to drive the tool accessory. A dust container is selectively coupled to the housing. A dust tube is coupled to the first end of the housing and in fluid communication with the dust container, wherein the dust tube is movable between an extended position and a retracted position. A fan is positioned within the housing and is operable to generate a suction air flow path through the dust tube and into the dust container, wherein the fan rotatably driven by the motor.

The present disclosure also provides, a handheld power tool including a housing, a tool receptacle disposed on a first end of the housing and configured to receive a tool accessory, a motor positioned within the housing and operatively coupled to the tool receptacle to drive the tool accessory, a dust container selectively coupled to the housing, an over-bit dust tube coupled to the first end of the housing and in fluid communication with the dust container, the over-bit dust tube movable between an extended position and a collapsed position, and a fan positioned within the housing and operable to generate an air flow path through the dust tube and into the dust container.

Additionally, the present disclosure provides a handheld power tool including a housing, a tool receptacle disposed on a first end of the housing and configured to receive a tool accessory, the tool accessory defining a working axis, a handle extending rearward from a second end of the housing, a motor positioned within the housing and operatively coupled to the tool receptacle to drive the tool accessory, a dust container selectively coupled to the housing, a dust tube coupled to the first end of the housing and in fluid communication with the dust container, the dust tube movable between an extended position and a retracted position, a dust transfer tube fluidly connecting the dust tube and the dust container, the dust transfer tube extending through at least a portion of the housing, and a fan positioned within the housing and operable to generate a suction air flow path through the dust tube and into the dust container.

In some embodiments, the dust container is substantially received within the housing.

In some embodiments, the handheld power tool includes a filter at least partially arranged within the dust container when the dust container is coupled to the housing.

In some embodiments, the drive assembly, the motor, the suction fan, and the filter are arranged within the upper half of the housing.

In some embodiments, a central axis of the filter and a rotational axis of the suction fan intersect at an obtuse angle.

In some embodiments, the dust container is prevented from being coupled to the housing when the filter is not positioned within the housing.

In some embodiments, the suction fan is driven by the motor. Further, in some embodiments the suction fan is mounted on a motor output shaft to be driven by the motor.

In some embodiments, the handheld power tool includes a cooling fan driven by the motor and operable to generate a second air flow path across the motor to cool the motor.

In some embodiments, the suction fan and the cooling fan are coaxial.

In some embodiments, the cooling fan generates a first air flow path, the first air flow path flowing from a cooling air intake positioned rearwardly of the motor to a cooling air exhaust positioned forwardly of the motor.

In some embodiments, the suction fan generates a second air flow path, the second air flow path flowing from an end of the suction pipe to a suction air exhaust positioned rearward of the motor.

In some embodiments, the handheld power tool includes a transfer tube in fluid communication with the suction pipe and the dust container to transfer dust from the suction pipe to the dust container, wherein the transfer tube includes a bend of between 0 and 90 degrees.

In some embodiments, the dust container is coupled to the transfer tube by a connection port.

In some embodiments, the handheld power tool includes a filter cleaning mechanism, wherein the filter cleaning mechanism is operable as an automatic filter cleaning mechanism. Further, in some embodiments the filter cleaning mechanism is operable as a manual filter cleaning mechanism.

In some embodiments, the filter cleaning mechanism includes a striker moveable between a first striker position and a second striker position, in which the striker is in contact with the filter, a spring biasing the striker to the first striker position, and a solenoid. Activation of the solenoid moves the striker to the second striker position such that the striker impacts the filter.

In some embodiments, the filter cleaning mechanism further includes an anvil disposed between the striker and the filter. The anvil is rotatable between a first anvil position in which the anvil is spaced from the filter and a second anvil position in which the anvil is in contact with the filter. A torsion spring biases the anvil to the first anvil position. Activation of the solenoid moves the striker to the second striker position such that the striker rotates the anvil, and the anvil impacts the filter.

In some embodiments, the dust container includes a latch located proximate to a handle section of the housing, the latch operable by a user while grasping the handle.

In some embodiments, the handheld power tool includes a depth stop disposed on the housing.

In some embodiments, the handheld power tool includes a collapsible over-bit suction pipe.

In some embodiments, the handheld power tool includes a single fan for generating a motor cooling air flow and a suction air flow. The single fan is a bi-axial flow fan with a radial exhaust.

Other features and aspects of the disclosure will become apparent by consideration of the following detailed description and accompanying drawings.

Figure 1:
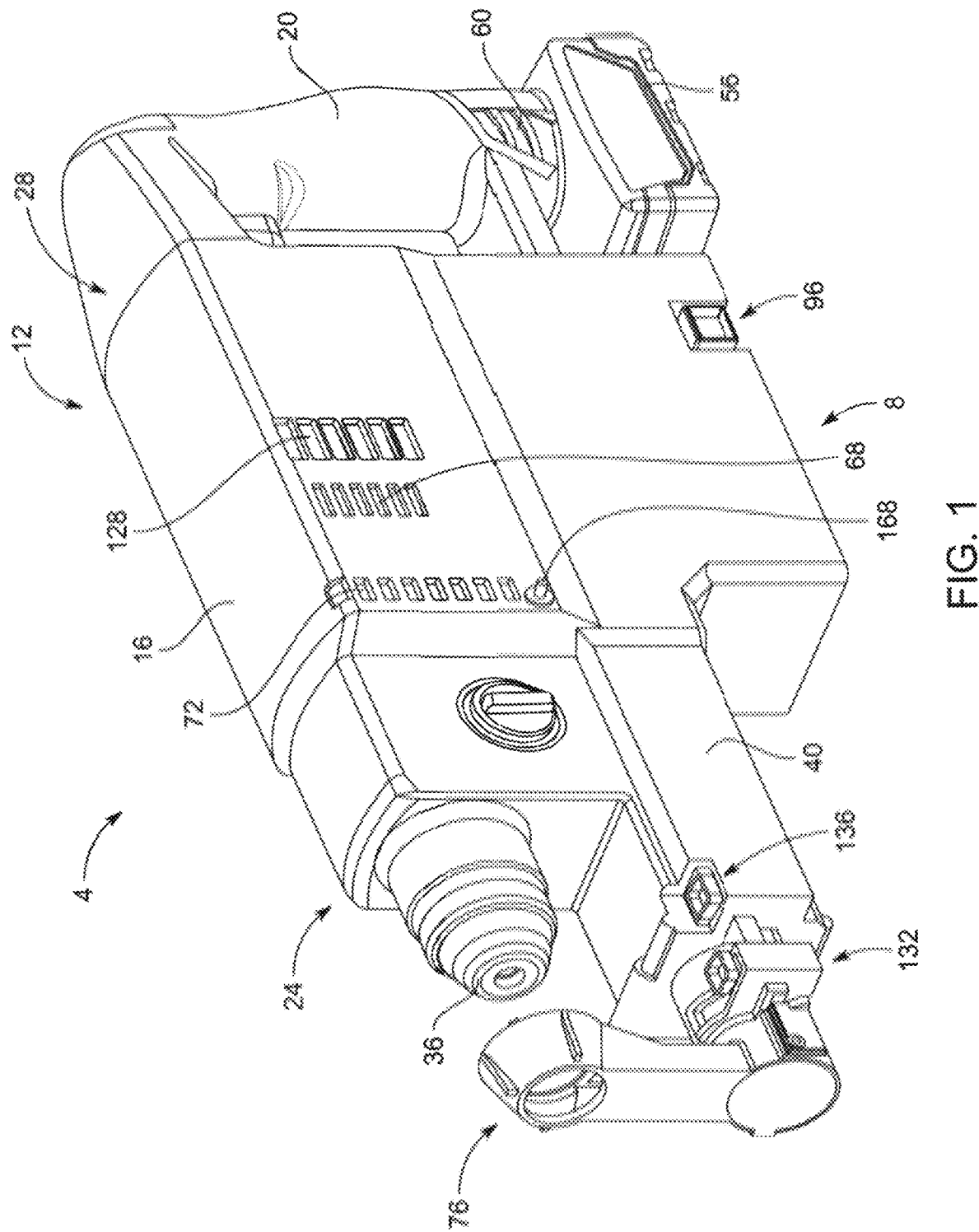
FIG. 1 is a front perspective view of a rotary hammer including an integrated dust collection assembly according to one embodiment.

Before any embodiments of the disclosure are explained in detail, it is to be understood that the present disclosure is not limited in its application to the details of construction and the arrangement of components set forth in the following description or illustrated in the following drawings. The present disclosure is capable of other embodiments and of being practiced or of being carried out in various ways. Also, it is to be understood that the phraseology and terminology used herein is for the purpose of description and should not be regarded as limiting.

DETAILED DESCRIPTION

Power tools, such as rotary hammers, generate a large amount of dust and debris when operating the tool. Accordingly, dust extractors or dust collection systems have been implemented to try and capture the dust rather than allowing the dust to be expelled into the air or breathed in by a user. Existing dust collection systems are generally completely separate tools that may be used in conjunction with the power tool. For example, some dust collections systems are contained within a separate tool housing and may be connected to the housing of the power tool. Other dust collection systems utilize a separate shop vacuum and dust passage to collect dust. Current dust collections systems can be bulky, awkward, or heavy when connected to the power tool.

Likewise, dust collection systems that utilize a separate shop vacuum may limit movement and maneuverability of the power tool due to the fact that it is restrained by the shop vacuum. Furthermore, because existing dust collections are typically realized as an independent tool, the overall tool system may be more costly due to the fact that duplicate parts may be included in the power tool and the dust collection system. For example, the power tool and the dust collection systems may each have their own battery, motor, fan, controller, housing, etc.

The present disclosure addresses some of these issues and also provides a series of other improvements that may be implemented to one or both a power tool and/or a dust collection assembly. The present disclosure provides a power tool with an integrated dust collection assembly contained within the power tool. As used in the present disclosure, integration of the dust collection assembly is intended to mean that at least some parts of the dust collection assembly are not removable from the power tool and/or are integrated within the same housing as the power tool. While some parts of the dust collection assembly may be removably coupled to the power tool, such as a suction tube and/or a dust container, other parts, such as a fan and/or a fan motor are not intended to be removed from the power tool. Additionally, integration of the dust collection assembly into the power tool may result in at least some of the components being utilized in a shared manner between the power tool and the dust collection assembly. However, this does not required all parts to be shared. Some parts of dust collection assembly may be separate from the power tool or may be duplicative of the parts in the power tool.

The integration of the dust collection assembly within the power tool may provide a number of different benefits. For example, the integration of the dust collection assembly within the power tool may allow for a reduced number of parts for the operation of the power tool and dust collection assembly. This may in turn reduce the overall cost of the system. Additionally, in some embodiments, the reduction of parts may also reduce the overall weight and size of the system. Likewise, in some embodiments, the profile of the tool system is more compact, which may allow a user to more easily maneuver and hold the tool system.

As will be understood by a person of ordinary skill in the art, although the present disclosure is described with respect to a rotary hammer, the features described herein may be applied to other handheld power tools which generate dust when operating. For example, in some embodiments, the present disclosure may be applied to other types of power tools, such as drills, grinders, polishers, sanders, cutting tools, or other power tools which generate dust.

Figure 2:
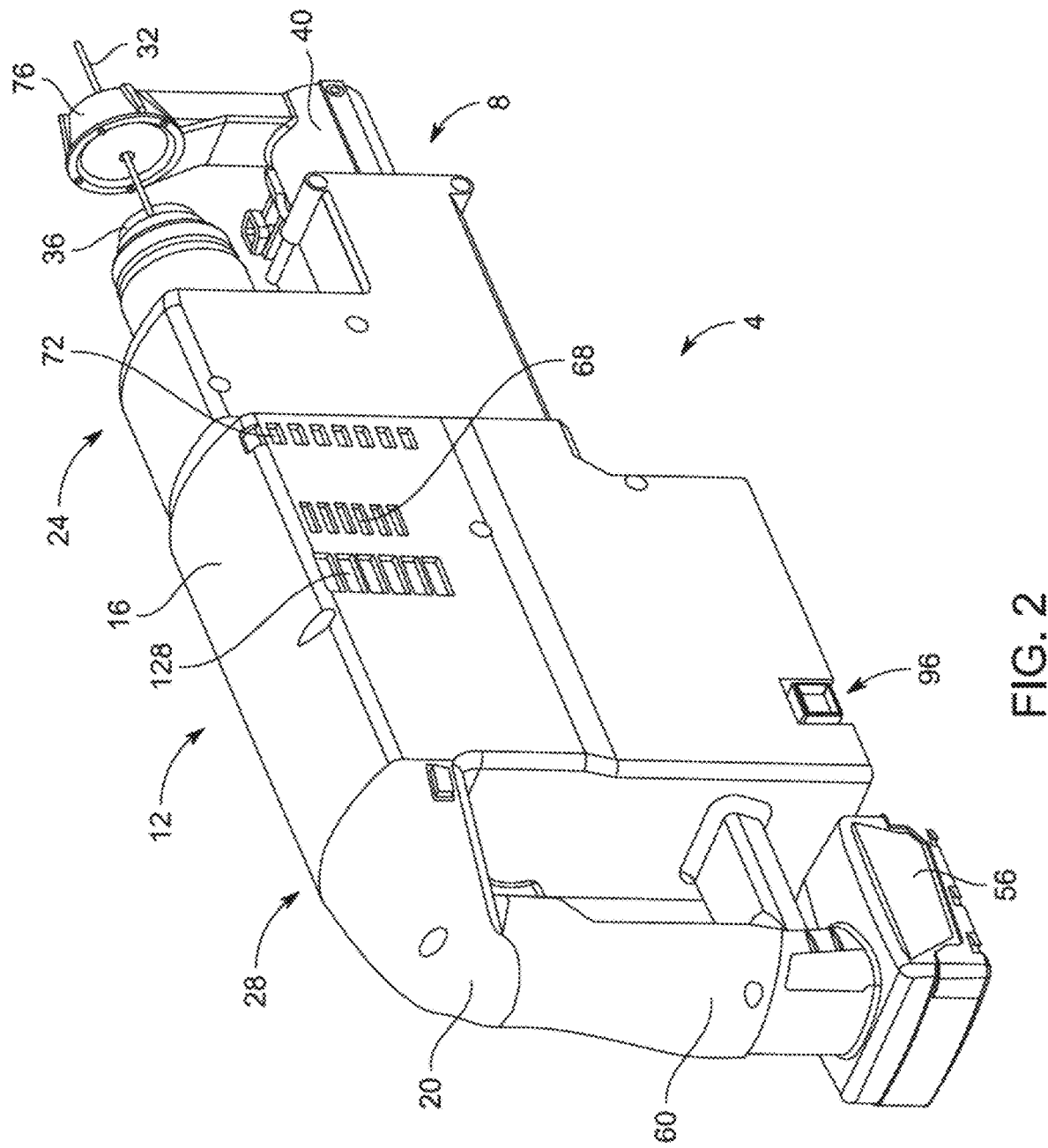
FIG. 2 is a rear perspective view of a rotary hammer including an integrated dust collection assembly according to one embodiment.

FIGS. 1 and 2 illustrate a power tool, such as a rotary hammer 4, according to one embodiment. The illustrated rotary hammer 4 includes a dust collection assembly 8 integrated within the body of the tool. In other embodiments, one or more portion of the dust collection assembly 8 may be realized as a separate element from the rotary hammer 4 or may be positioned externally of the rotary hammer 4. As will be appreciated based on the present disclosure, the integration of the dust collection assembly 8 within the rotary hammer 4 may allow for a reduced number of parts for the operation of the rotary hammer 4 and dust collection assembly 8. For example, in some embodiments, the dust collection assembly 8 and the rotary hammer 4 may share certain parts. In some embodiments, this may reduce the overall cost of the system. Similarly, in some embodiments, this may reduce the overall weight and size of the system. Likewise, in some embodiments, the profile of the tool system is more compact, which may allow a user to more easily maneuver and hold the tool system. It should be understood that the various features and embodiments described in the present disclosure may be mixed together or interchanged into different combinations of features and embodiments. In other words, the specific combinations of features disclosed herein are not intended to be limiting, but are purely for the sake of illustrating example embodiments including various features of the overall disclosure.

Figure 3A:
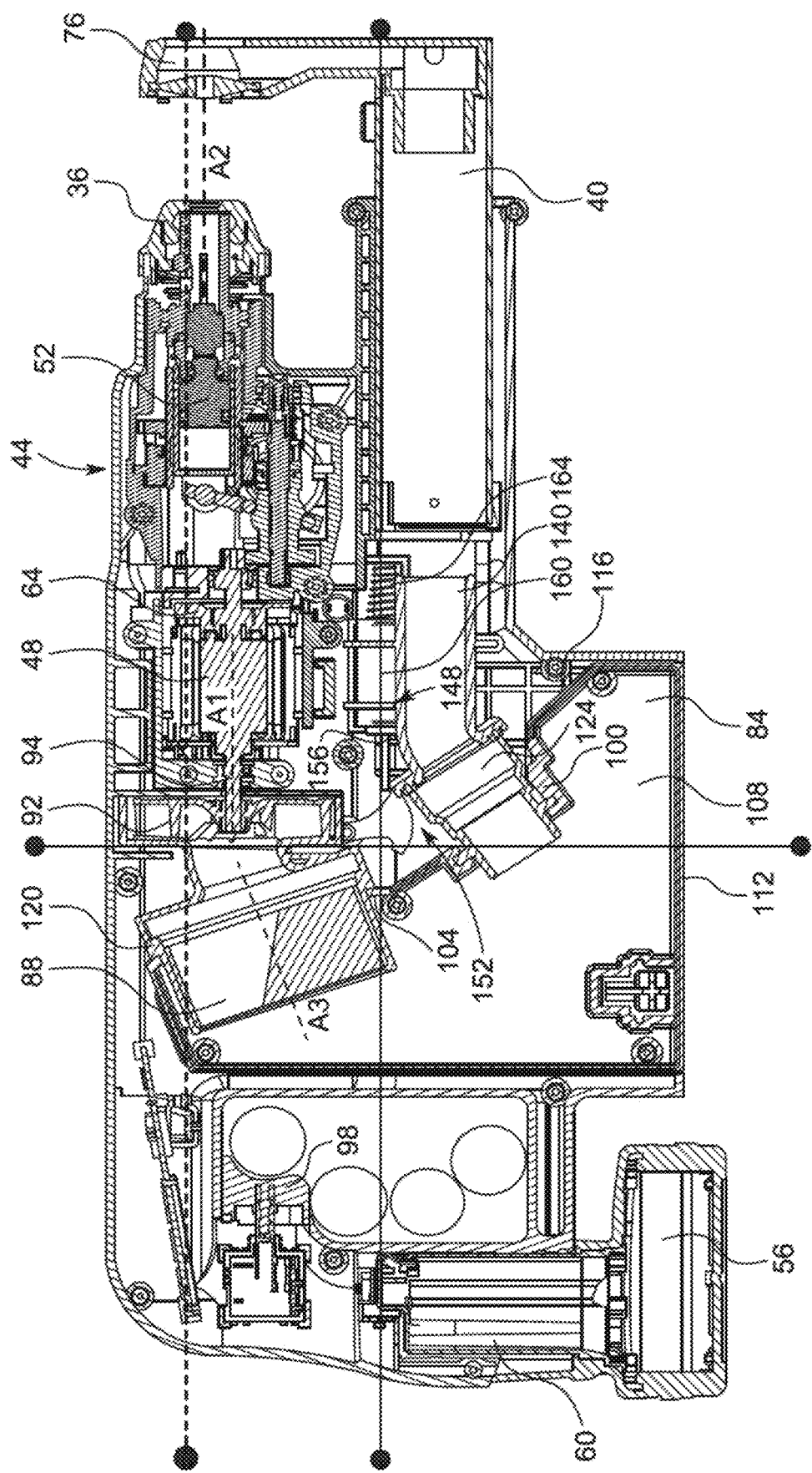
FIG. 3A is a first cross-sectional view of the rotary hammer of FIG. 1.
Figure 3B:
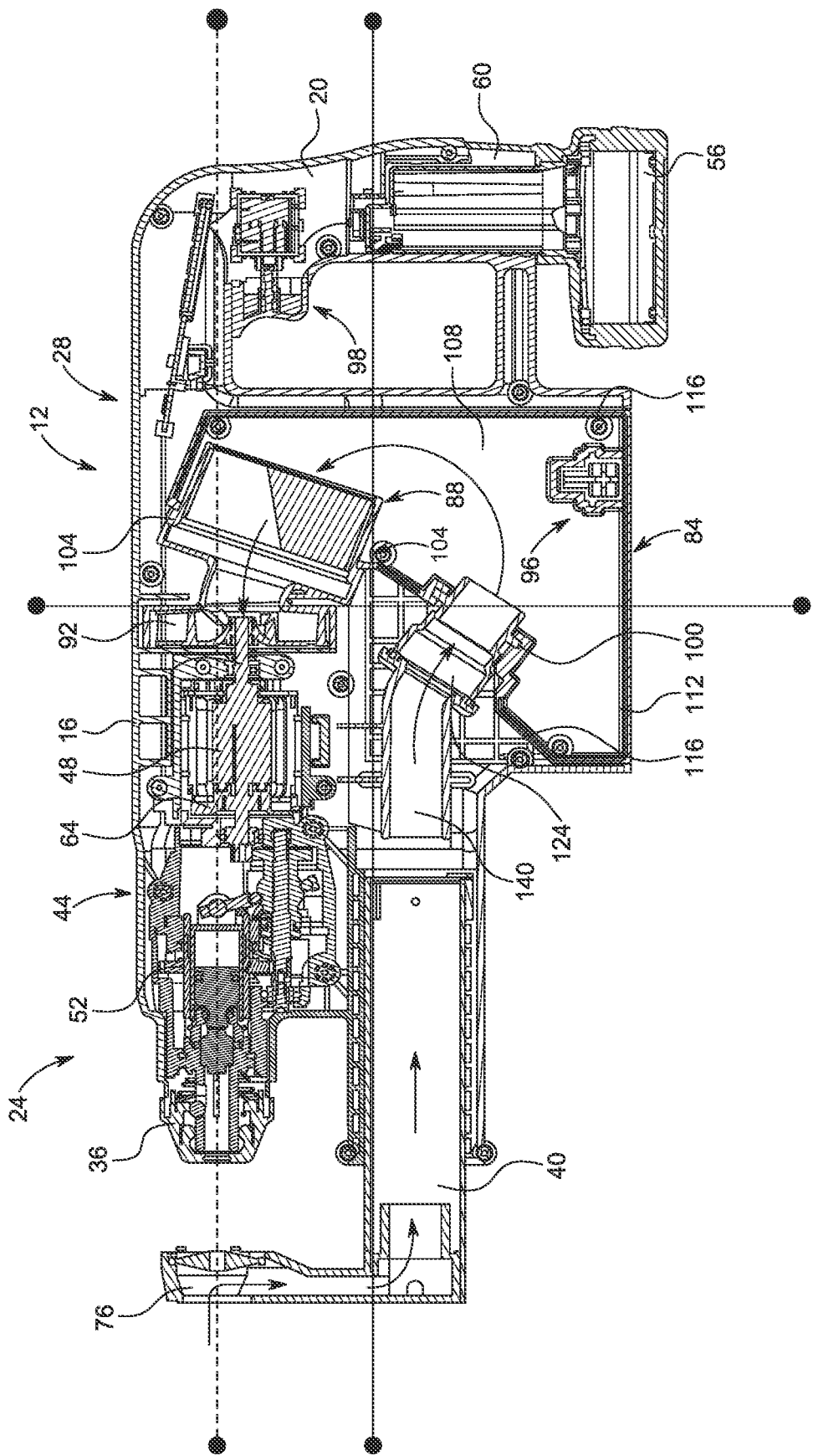
FIG. 3B is a second cross-sectional view of the rotary hammer of FIG. 1.

The rotary hammer 4 includes a housing 12 having a main body 16 and a handle 20 extending rearward of the main body 16. The main body 16 includes a first end 24 to which a tool bit 32 may be coupled, and a second end 28 from which the handle 20 extends. The tool bit 32 may be received within a chuck assembly 36 formed in the first end 24 of the main body 16. Additionally, a suction pipe 40 is slidably engaged with the first end 24 of the main body 16. As shown in FIGS. 3A and 3B, the housing 12 may be divided into quadrants defined by an upper half, a lower half, a front half, and a rear half. In the illustrated embodiment, the upper half begins above the suction pipe 40 of the dust collection assembly 8. Additionally, in the illustrated embodiment, the front half begins at the first end 24 of the housing 12 and extends to a midway point between the first end 24 of the main body 16 and a rear end of the handle 20. Accordingly, this provides for an upper front quadrant (UFQ), an upper rear quadrant (URQ), a lower front quadrant (LFQ), and a lower rear quadrant (LRQ). However, in other embodiments, the quadrants may be defined by different divisions.

A drive unit 44 is positioned within the main body 16 of the housing 12. The drive unit 44 includes a motor 48 and a drive assembly 52 operatively coupled to the motor 48 for receiving torque from the motor 48. The motor 48 defines a motor axis A1 that is parallel with a working axis A2 of the rotary hammer 4. The working axis A2 of the rotary hammer 4 is defined as the axis through the tool bit 32 and the drive assembly 52. Power to the motor 48 is provided by a battery 56, which may be received within a battery receptacle 60 on a bottom portion of the handle 20. However, in other embodiments, the battery receptacle 60 may be disposed within other portions of the housing 12.

A cooling fan 64 is operably coupled to the motor 48 and shares a rotational axis with the motor axis A1. The motor 48 thereby drives both the drive assembly 52 and the cooling fan 64. In the illustrated embodiment, the cooling fan 64 is positioned on a forward side of the motor 48 between the chuck 36 and the motor 48. In another embodiment, the cooling fan 64 is operably coupled to the motor 48 and positioned below the drive unit 44. As will be described in further detail herein, the cooling fan 64 draws air along an airflow path which extends across the motor 48 to cool the motor 48. More specifically, the cooling fan 64 draws in air via a cooling air intake 68 disposed in the housing 12 on a rearward side of the motor 48, and exhausts air via a cooling air exhaust 72 disposed in the housing 12 on a forward side of the motor 48.

In the illustrated embodiment, the drive unit 44 and the cooling fan 64 are positioned within the upper half of the housing 12. Accordingly, the drive unit 44 and the cooling fan 64 are positioned above the suction pipe 40. Further, the drive unit 44 and the cooling fan 64 are positioned within a front half of the housing 12. The arrangement of the drive unit 44 and the cooling fan 64 within the upper front quadrant provides for additional space for the dust collection assembly 8. For example, the drive unit 44 does not extend (or only minimally extends) into the upper rear quadrant.

Accordingly, a space exists between the drive unit 44 and the second end 28 of the main body 16. Likewise, the drive unit 44 does not extend (or only minimally extends) into the lower front quadrant and the lower rear quadrant, leaving sufficient space for the dust collection assembly 8.

The rotary hammer 4 also includes a dust collection assembly 8. In the illustrated embodiment, the dust collection assembly 8 is integrated within the main body 16 of rotary hammer 4. However, in other embodiments, one or more part of the dust collection assembly 8 may be disposed within the handle 20 of the rotary hammer 4 or may be positioned externally of the housing 12. With reference to FIGS. 3A-3B, the dust collection assembly 8 includes a nozzle 76, a telescoping suction pipe 40, a dust container 84, a filter 88, and a suction fan 92. The nozzle 76 is located at a first end of the telescoping suction pipe 40 and proximate to the tool bit 32 of the rotary hammer 4 such that the tool bit 32 extends through the nozzle 76. A second end of the telescoping suction pipe 40 extends into the housing 12 such that the suction pipe 40 extends and retracts from the first end 24 of the main body 16.

Figure 14:
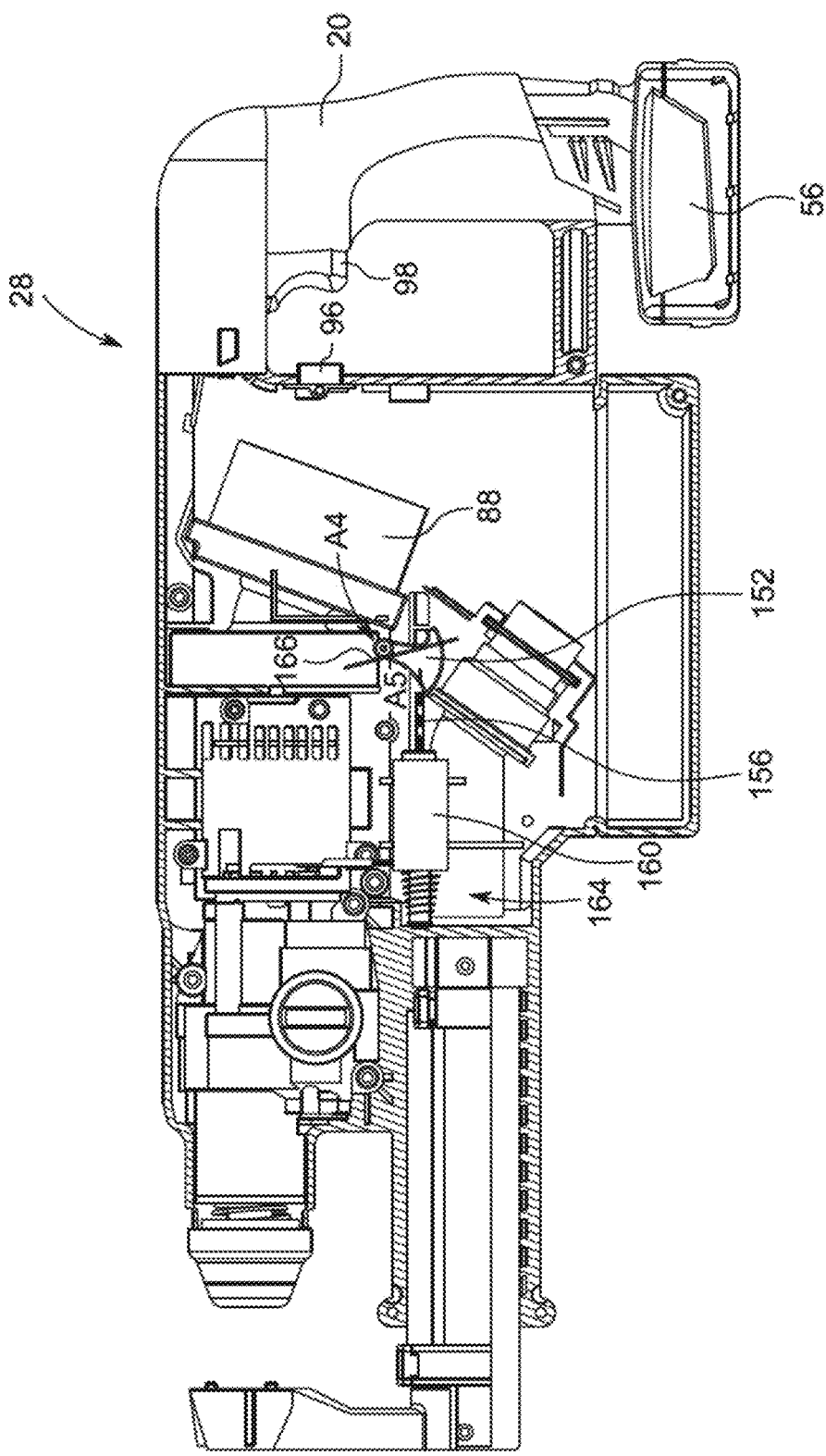
FIG. 14 is a cross-sectional view of a rotary hammer including an integrated dust collection assembly according to yet another embodiment.

The dust container 84 is selectively attachable to the housing 12. The dust container 84 is detachable from the housing 12 of the rotary hammer 4 and may be removed to allow an operator to empty the dust and other debris from the dust container 84. A latch 96 operable by a user to selectively decouple the dust container 84 from the housing 12 is located on the housing 12 proximate the handle 20. In the embodiment of FIG. 2, the latch 96 is positioned near the bottom edge of the housing 12. In another embodiment, as shown in FIG. 14, the latch 96 may be located on the second end 28 of the housing 12 such that it is facing the handle 20 and positioned to be operated by a user while the user grasps the handle 20. In the illustrated embodiment, the latch 96 is located opposite a trigger switch 98 which selectively operates the rotary hammer 4. In the illustrated embodiment, the dust container 84 is prevented from being secured to the housing 12 without the filter 88 in place. For example, the filter 88 acts as a portion of the connection between the dust container 84 and the housing 12. Thus, without the filter 88 in place, the dust container 84 is prevented from being coupled to the housing 12.

When coupled to the rotary hammer 4, the dust container 84 is substantially received within the main body 16 of the housing 12 such that it does not extend (or only minimally extends) outside of the housing 12 when coupled to the housing 12. However, in other embodiments, the dust container 84 may only be partially received within the housing 12 or may be attached to an outer portion of the housing 12. In the illustrated embodiment, the dust container 84 extends along the width of bottom portion of the main body 16. Additionally, the dust container 84 extends into the upper rear quadrant and into the space between the drive unit 44 and the second end 28 of the main body 16.

The dust container 84 includes an inlet 100 for a dust laden air stream and an outlet 104 defined by an outlet end of the filter 88. More specifically, the dust container 84 includes opposite side walls 108 and a bottom wall 112 extending between the side walls 108. The dust container 84 additionally includes end walls 116 adjacent each of the side walls 108 and the bottom wall 112. An opening 120 is defined in a first end wall 116 through which the filter 88 is received. The first end wall 116 further includes the inlet 100 for dust laden air. A connection port 124 extends through the inlet 100 to direct the dust laden air from the suction pipe 40 into the dust container 84. In some embodiments, the connection port 124 is a DEC 26 connection. The dust container 84 is operable to collect dust and other debris from a workpiece during drilling and/or hammering operation performed by the rotary hammer 4 to maintain a user's work area substantially clear of dust and other debris.

As mentioned, the dust container 84 extends upward into to the housing 12 of the rotary hammer 4 between the motor 48 and the handle 20. The filter 88 is positioned within the dust container 84 in the section of the dust container 84 extending into the space between the motor 48 and the second end 28 of the main body 16 (i.e., the upper rear quadrant). In other embodiments, the filter 88 may be positioned in other sections of the dust container 84. In some embodiments, the filter 88 is a high efficiency particulate air ("HEPA") filter positioned between the dust container 84 and a suction fan 92.

The suction fan 92 is positioned rearwardly of the motor 48 adjacent the filter 88 to draw dust laden air through the filter 88. The suction fan 92 is directly mounted to an output shaft 94 of the motor 48 and shares a rotational axis with the motor axis A1. In some embodiments, however, the suction fan 92 is operatively coupled to the motor 48 via other mechanical means such as a clutch, belt, or power take off. The motor 48, suction fan 92, and filter 88 are located within the upper half of the housing 12 as seen in FIG. 3. More specifically, the filter 88 is in-line with the suction fan 92, motor 48, the cooling fan 64, and drive unit 44. An axis A3 through the center of the filter 88 intersects the rotational axis A1 of the suction fan 92 at an obtuse angle. In the illustrated embodiment, the axis A3 through the filter 88 is defined as extending perpendicular from the surface of the filter 88 facing the suction fan 92. The angled orientation of the filter 88 results in an overall length of the rotary hammer 4 as measured from a rearmost point on the handle 20 of the housing 12 to a forwardmost point on the nozzle 76 of the dust collection assembly 8 being reduced. The obtuse angle of the filter 88 may improve the vertical-up operation of the rotary hammer 4. Additionally, the obtuse angle of the filter 88 may provide for an improved sealing surface between the dust container 84 and the filter 88.

When rotated by the motor 48, the suction fan 92 creates an air flow which generates a vacuum in the suction pipe 40 to draw dust and other debris into the dust container 84 and through the filter 88. After the dust is separated from the air via the filter 88, the clean air is exhausted through an exhaust port 128 formed in the housing 12 adjacent the suction fan 92. As shown in FIG. 1, the exhaust port 128 is positioned rearward of the motor 48 and adjacent the suction fan 92.

With continued reference to FIGS. 3A-3B, the suction pipe 40 extends longitudinally within the rotary hammer 4 housing in a direction parallel to the working axis A2. The suction pipe 40 is configured to move along the same longitudinal axis, thereby adjusting the length of the suction pipe 40 and the location of the nozzle 76. As the tool bit 32 plunges into the workpiece, the suction pipe 40 retracts into the housing 12 in a telescoping manner. Included within the rotary hammer housing 12 is a plunge depth stop 132, which limits the extent to which the suction pipe 40 may retract into the housing 12, and in turn, limits the extent to which the tool bit 32 can plunge into the workpiece. The plunge depth stop 132 is movable along the length of the suction pipe 40 and is selectively fixed to limit the extent to which the suction pipe 40 may retract into the housing 12. Also included on the housing 12 is an extension stop 136. The extension stop 136 limits the extent to which the suction pipe 40 may extend out of the housing 12 by selectively fixing to the suction pipe 40 along the length of the suction pipe 40. This feature can be used to adjust the extension length of the suction pipe 40 to correspond to the size of the tool bit 32 being used. For example, when using a 2-inch tool bit, the extension length of the suction pipe 40 can be reduced to 2 inches to correspond to the length of the tool bit 32. If the length of the suction pipe 40 is not limited, then the end of the suction pipe 40 may extend far beyond the end of the tool bit 32.

Coupled to the suction pipe 40 is a transfer tube 140. The transfer tube 140 is stationary with respect to the housing 12 and functions as a connection between the suction pipe 40 and dust container 84. A first end of the transfer tube 140 proximate the dust container 84 has a bend of between 0 and 90 degrees. The connection port 124 is coupled to the first end of the transfer tube 140 to facilitate the connection with the dust container 84. In some embodiments the connection port 124 may be a DEC 26 port. The bend in the transfer tube 140 and the connection port 124 may provide for an improved seal between the transfer tube 140 and dust container 84. Additionally, the connection port 124 allows a user to remove the dust container 84, for the purpose of emptying the dust container 84, without exposure to the dust within the dust container 84.

Figure 4:
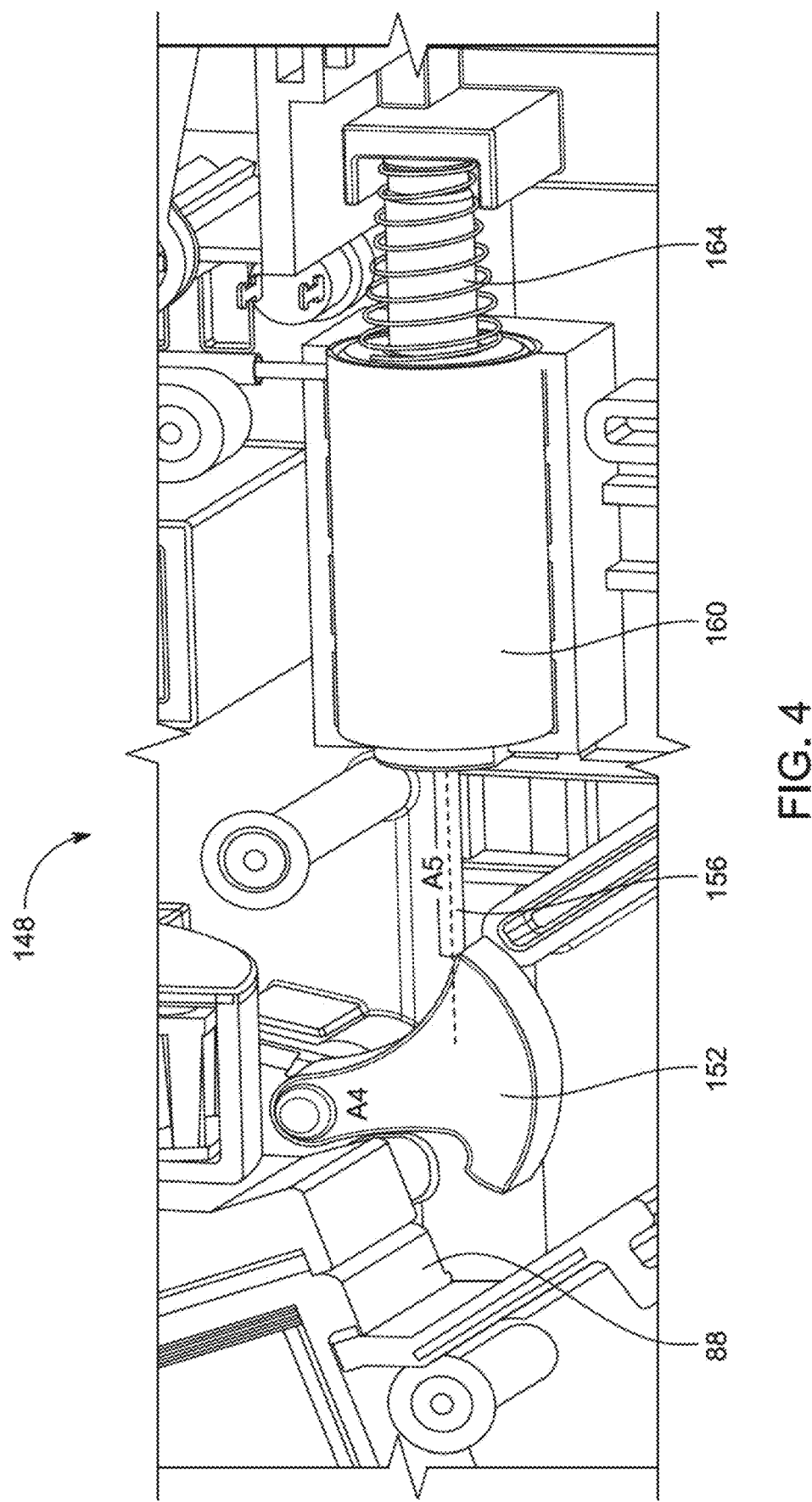
FIG. 4 is an enlarged cross-sectional view of the rotary hammer of FIG. 3.

With reference to FIGS. 3A and 4, a filter cleaning mechanism 148 is disposed within the housing 12 and positioned proximate a forwardmost edge of the filter 88. In other embodiments, the filter cleaning mechanism 148 can be positioned proximate any edge of the filter 88. The filter cleaning mechanism 148 includes an anvil 152 for impacting the filter 88, a striker 156 for striking the anvil 152, a solenoid 160 for causing the striker 156 to strike the anvil 152, and a biasing member 164 for biasing the striker 156. The anvil 152 is positioned proximate the filter 88 and coupled to the housing 12 about an anvil axis A4. The anvil 152 rotates about the anvil axis A4 to move between a first anvil position spaced from the filter 88 and a second anvil position in contact with an impact location on the filter 88. The striker 156 has a longitudinal axis A5 parallel to the working axis A2 of the rotary hammer 4 along which the striker 156 moves between a first striker position and a second striker position. In the first striker position, the striker 156 is in contact with the anvil 152 at the first anvil position. In other embodiments, the striker 156 may be spaced from the anvil 152 while in the first striker position. In the second striker position, the striker 156 is in contact with the anvil 152 such that the anvil 152 rotates to the second anvil position and contacts the filter 88 at an impact location. In some embodiments, the filter cleaning mechanism 148 does not include an anvil 152. Rather, the striker 156 directly impacts the filter 88 when in the second striker position. The solenoid 160 is supported by the housing 12 and surrounds at least a portion of the striker 156. The biasing member 164 is located on the opposite end of the striker 156 and solenoid 160 with respect to the anvil 152 and filter 88. In the illustrated embodiment, the biasing member 164 is a compression spring. The biasing member 164 biases the striker 156 toward the first striker position until the solenoid 160 is activated, at which point the solenoid 160 overpowers the biasing member 164 causing the striker 156 to move to the second striker position. In the embodiment of FIG. 14, a second biasing member 166, illustrated as a torsion spring, is coupled to the anvil 152 for biasing the anvil 152 to the first anvil position.

The filter cleaning mechanism 148 operates as follows. In one embodiment, the filter cleaning mechanism 148 is automatically actuated when the suction fan 92 becomes inactive. A controller (not shown) controls activation of the solenoid 160 to move the striker 156. Triggering the solenoid 160 may be based on detection of inactivity of the suction fan 92 or inactivity of the motor 48. As used herein, the suction fan 92 may be considered inactive when it has stopped rotating, or the suction fan 92 may be considered inactive when the suction fan 92 is rotating at a speed below a predetermined threshold when the airflow induced by the suction fan 92 has effectively stopped. Similarly, the motor 48 may be considered inactive when it has stopped rotating, or it is operating below a predetermined threshold of rotational speed. In another embodiment, the filter cleaning mechanism 148 may be actuated while the suction fan 92 or motor 48 is active. In the illustrated embodiment an actuator, such as a push button 168, is disposed on the outside of the housing 12 and allows the user to manually initiate the filter cleaning mechanism 148 (FIG. 1). The push button 168 allows an operator to clean the filter 88 at will or intermediately between the automatic cleaning operation.

In a rest state, the anvil 152 is in the first anvil position, the striker 156 is in the first striker position, and the solenoid 160 is not energized. To initiate the operational state, the solenoid 160 must be energized either automatically or through the push button 168. Once energized, the solenoid 160 overpowers the biasing member 164 causing the striker 156 to move from the first striker position to the second striker position. Once at the second striker position, the striker 156 strikes the anvil 152 causing the anvil 152 to move from the first anvil position to the second anvil position and impact the filter 88 at the impact location. The impact of the anvil 152 on the filter 88 causes the dislodging of dust and other debris from the filter 88. After the anvil 152 impacts the filter 88, the solenoid 160 is automatically deactivated, thereby allowing the anvil 152 and striker 156 to return to the first anvil and striker positions, respectively.

The rotary hammer 4 of the embodiment of FIGS. 1-4 utilizes a single power source (e.g., a battery 56) and single electric motor 48 to operate the drive assembly 52 and dust collection assembly 8. Portions of the dust collection assembly 8 being integral with the housing 12 may allow for an improved component layout for vertical up operations. Two distinct air flow paths are designated within the housing 12. The first air flow path is the dust collector flow path in which dust laden air enters through a suction air inlet in the nozzle 76, travels through the suction pipe 40, into the transfer tube 140, and deposits the dust with the help of the filter 88 into the dust container 84. After passing through the dust container 84 and filter 88, the now clean air exits the housing 12 through the suction air exhaust 128. The air flow in the dust collector flow path is driven by the suction fan 92 and motor 48. The second air flow path is characterized as a cooling air flow path. The cooling air flow path includes the cooling air intake 68 on the housing 12 and the cooling air exhaust 72 on housing 12 spaced away from the cooling air intake 68. Air in the cooling air flow path enters through the cooling air intake 68, is directed over the motor 48 to cool the motor 48 and exits through the cooling air exhaust 72. The cooling air path is powered by the cooling fan 64 which is mounted coaxially on the motor 48 with the suction fan 92.

Figure 5:
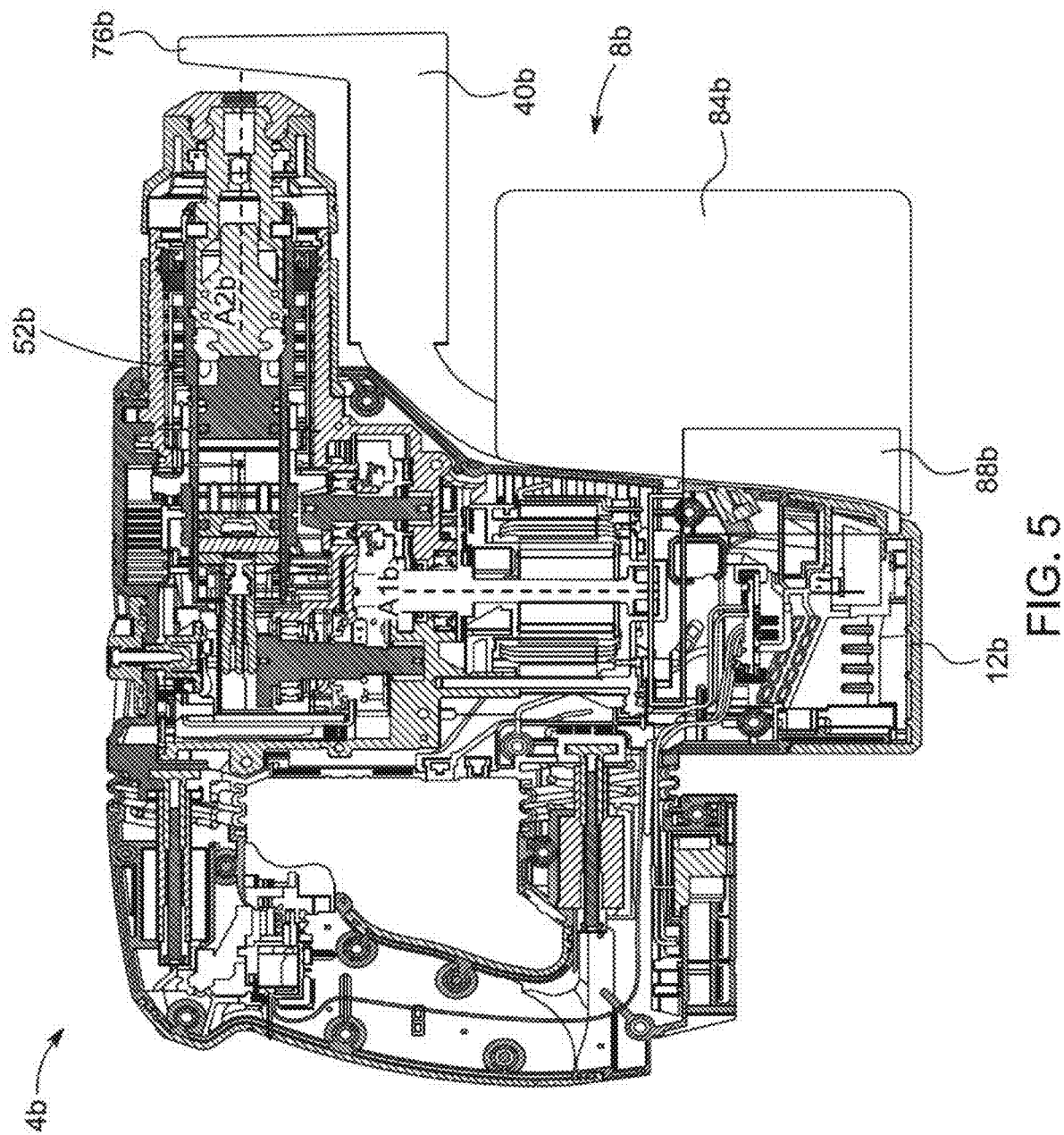
FIG. 5 is a schematic illustration of a rotary hammer including an integrated dust collection assembly according to another embodiment.

FIG. 5 illustrates another embodiment of a rotary hammer 4b with an integrated dust collection assembly 8b, with like parts having like reference numerals plus the letter "b", and the following differences explained below. In the embodiment illustrated in FIG. 5, the motor axis A1b of this embodiment is perpendicular to the drive assembly 52b and working axis A2b. The dust container 84b is selectively coupled to the housing 12b on a lower front portion beneath the drive assembly 52b. The orientation of this embodiment may improve vertical down operation and results in a rotary hammer 4b of reduced length.

Figure 6:
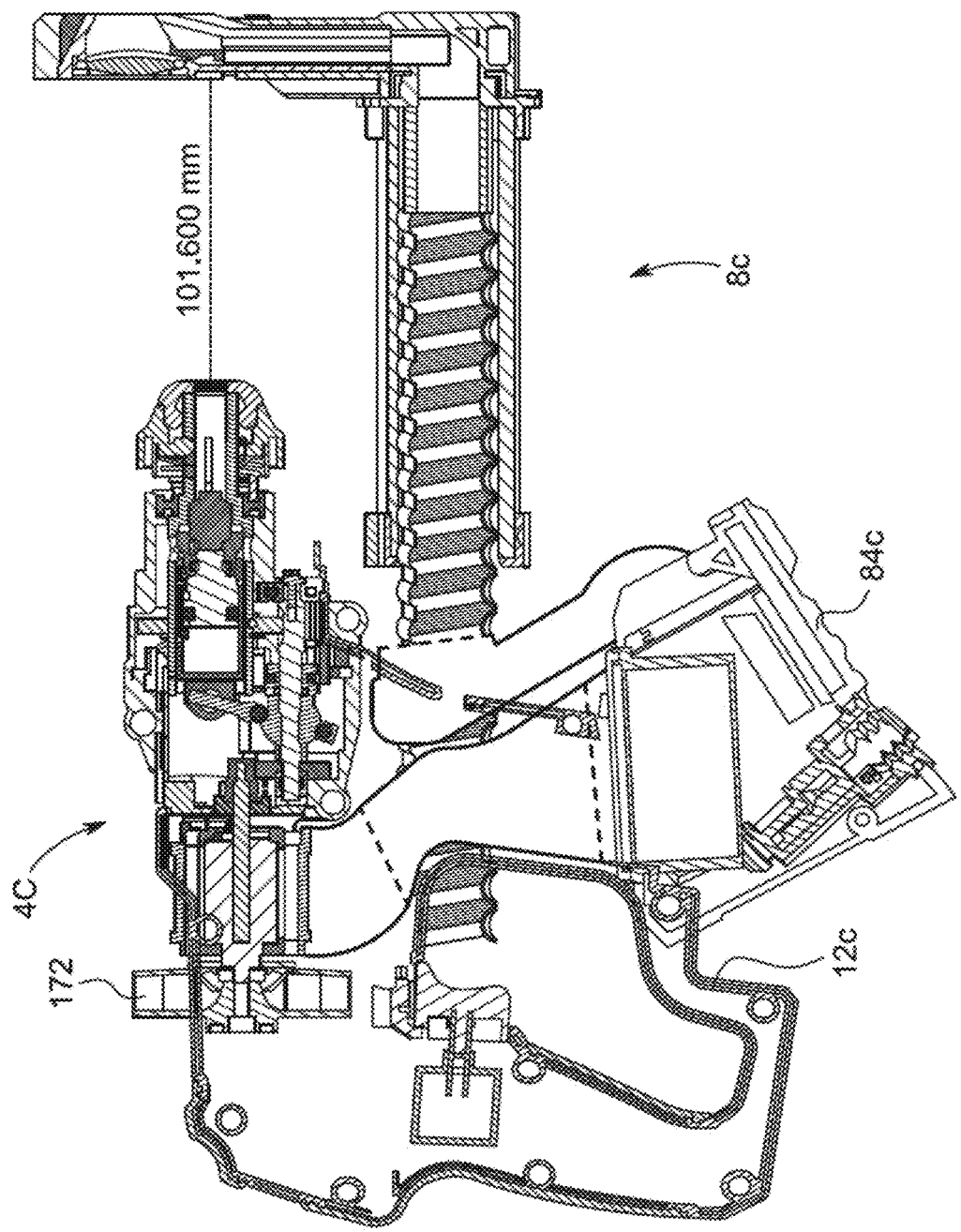
FIG. 6 is a schematic illustration of a rotary hammer including an integrated dust collection assembly according to yet another embodiment.

FIG. 6 illustrates yet another embodiment of a rotary hammer 4c with an integrated dust collection assembly 8c, with like parts having like reference numerals plus the letter "c", and the following differences explained below. The housing 12c includes a lower housing portion designed to interface with a dust container 84c. A single fan 172, driven by the motor 48c, provides suction for the dust collector air flow and the cooling air flow. The rotary hammer 4c of this embodiment may improve horizontal drilling. Advantageously, this embodiment has only a single fan 172 for cooling the motor and driving the dust extractor.

Figure 7:
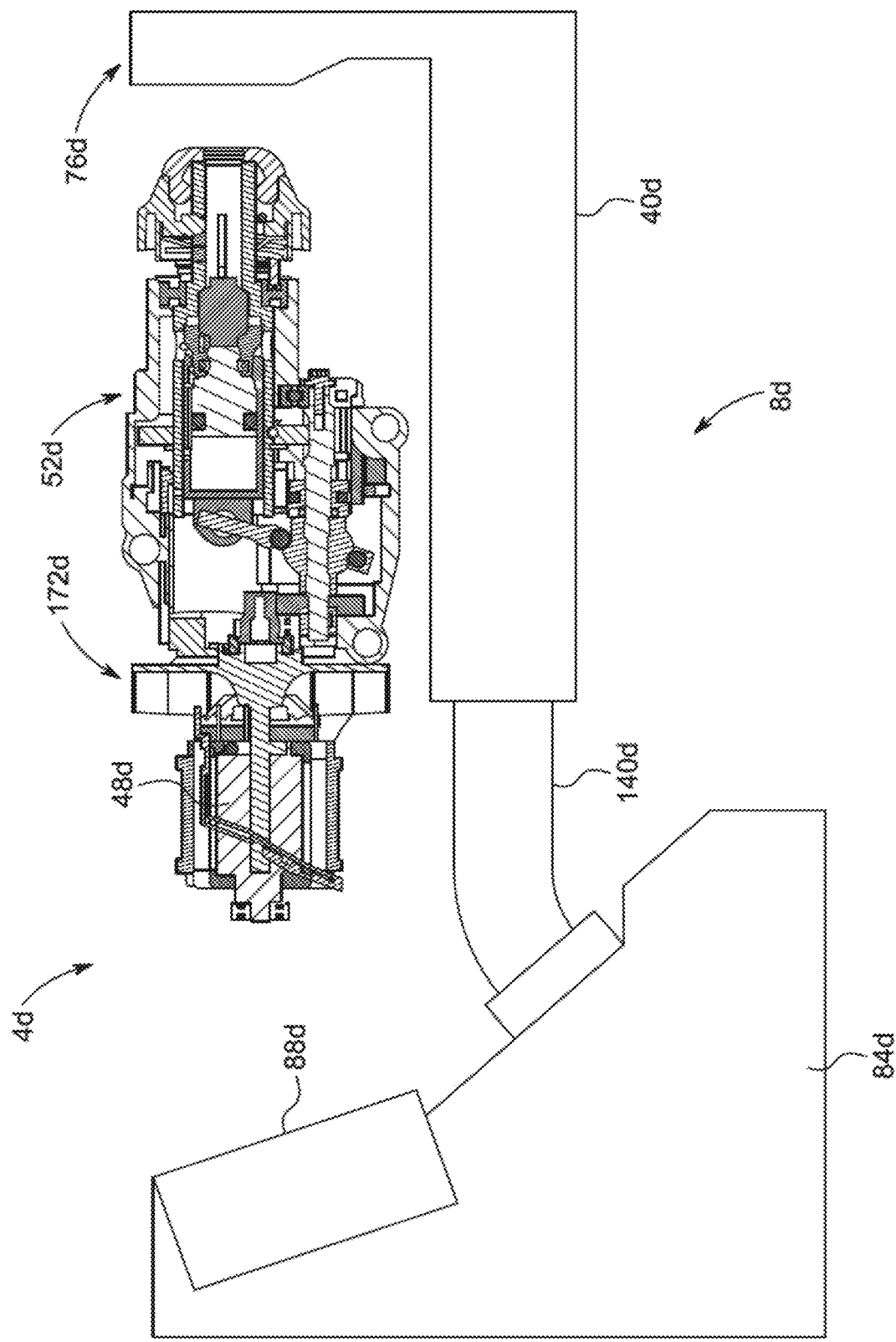
FIG. 7 is a schematic illustration of a rotary hammer including an integrated dust collection assembly according to yet another embodiment.

FIG. 7 illustrates yet another embodiment of a rotary hammer 4d with an integrated dust collection assembly 8d, with like parts having like reference numerals plus the letter "d", and the following differences explained below. A single fan 172d, located axially between the motor 48d and drive assembly 52d within the housing 12d, provides the suction for both the dust collector air flow and cooling air flow. The arrangement of dust collection assembly 8d components, namely the filter 88d, dust container 84d, transfer tube 140d, suction pipe 40d, and nozzle 76d, remains unchanged from the embodiment of FIGS. 1-4. This orientation results in a rotary hammer 4d with improved vertical up operations.

Figure 8:
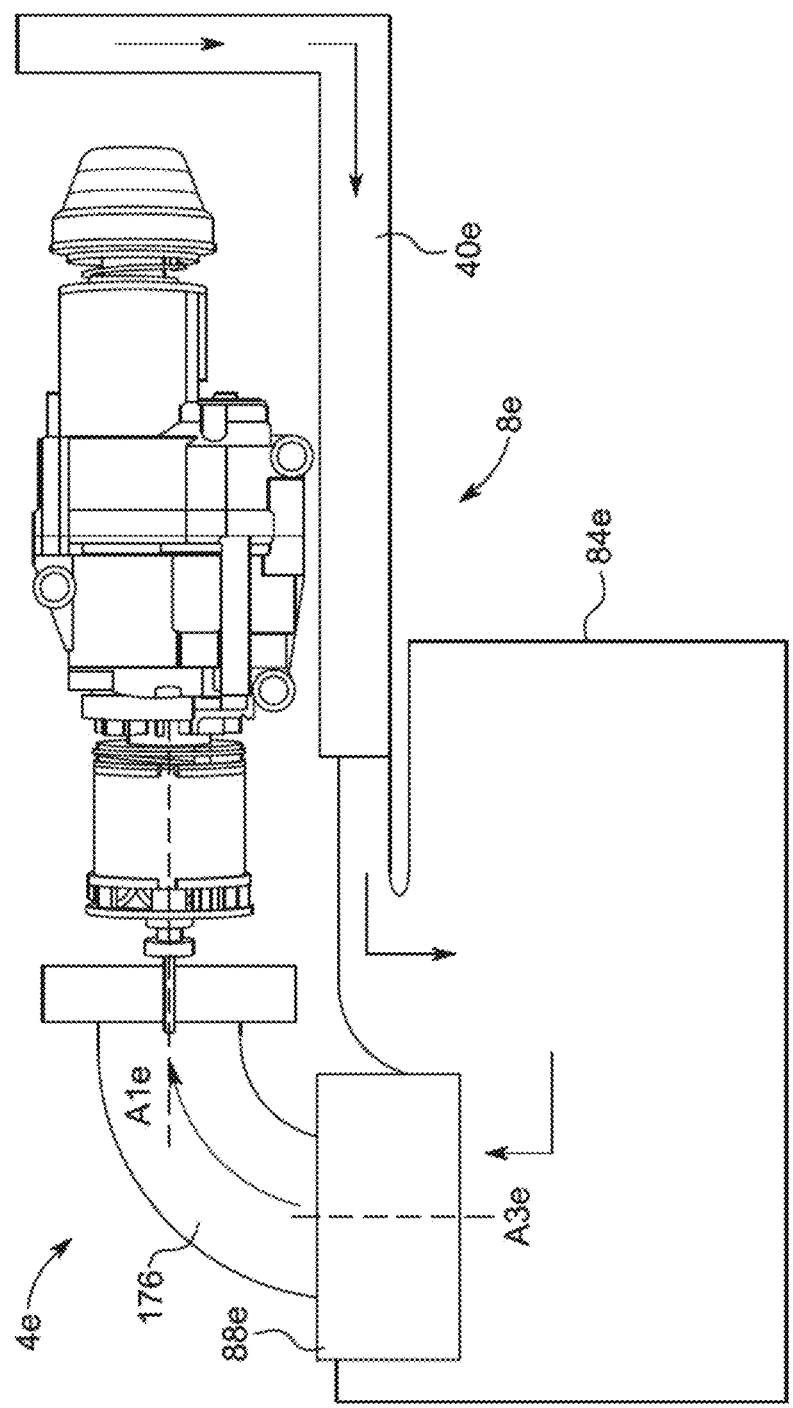
FIG. 8 is a schematic illustration of a rotary hammer including an integrated dust collection assembly according to yet another embodiment.

FIG. 8 illustrates yet another embodiment of a rotary hammer 4e with an integrated dust collection assembly 8e, with like parts having like reference numerals plus the letter "e", and the following differences explained below. A secondary transfer tube 176 is located between the filter 88e and the suction pipe 40e. Additionally, the filter axis A3e is oriented perpendicularly to the motor axis A1e. This housing 12e orientation results in a reduced tool height and increased tool length. The tool orientation of this embodiment may improve horizontal operations.

Figure 9:
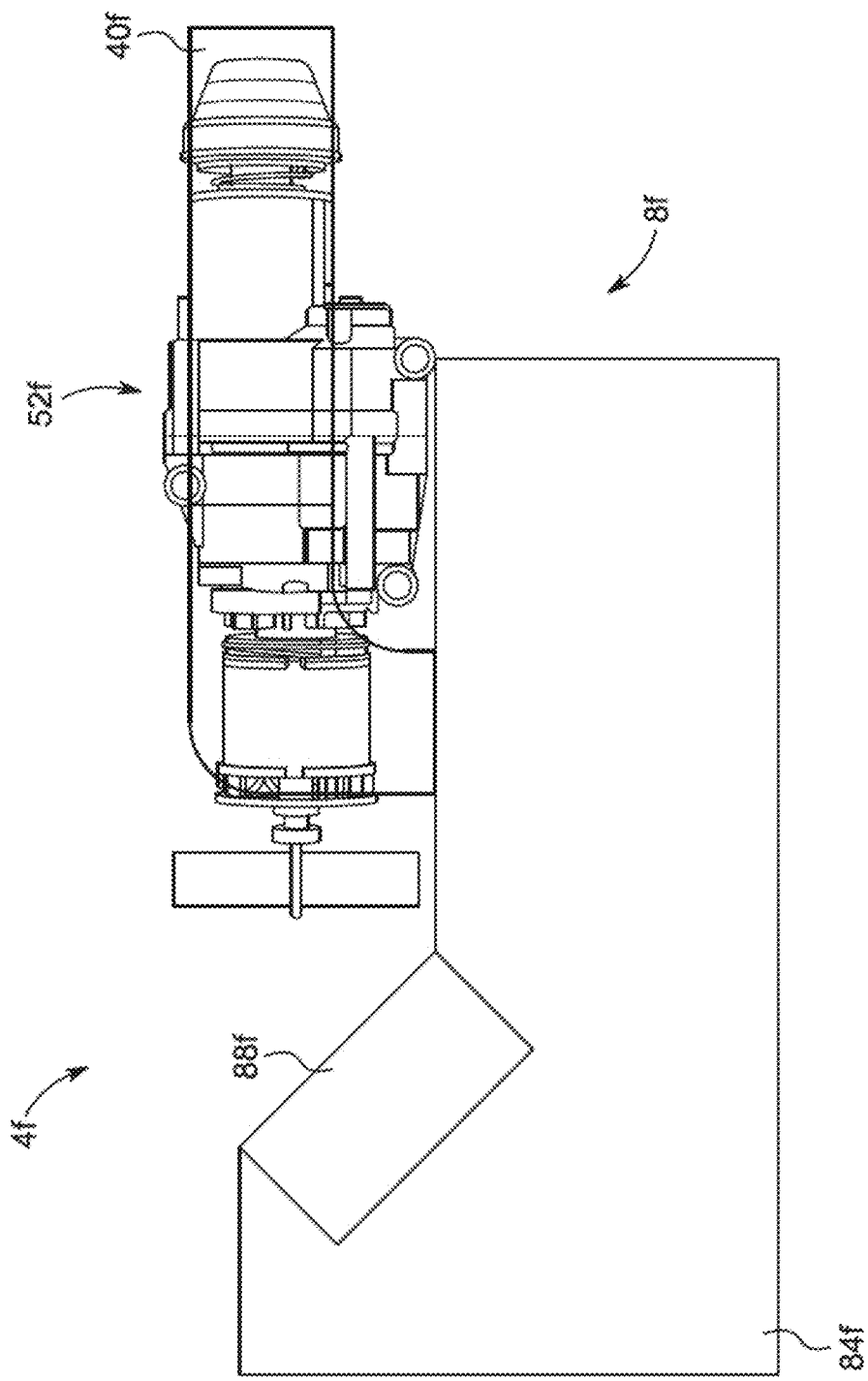
FIG. 9 is a schematic illustration of a rotary hammer including an integrated dust collection assembly according to yet another embodiment.

FIG. 9 illustrates yet another embodiment of a rotary hammer 4f with an integrated dust collection assembly 8f, with like parts having like reference numerals plus the letter "f", and the following differences explained below. The suction pipe 40f is located horizontally next to the drive assembly 52f. This results in a shorter tool height and is optimized for horizontal drilling.

Figure 10:
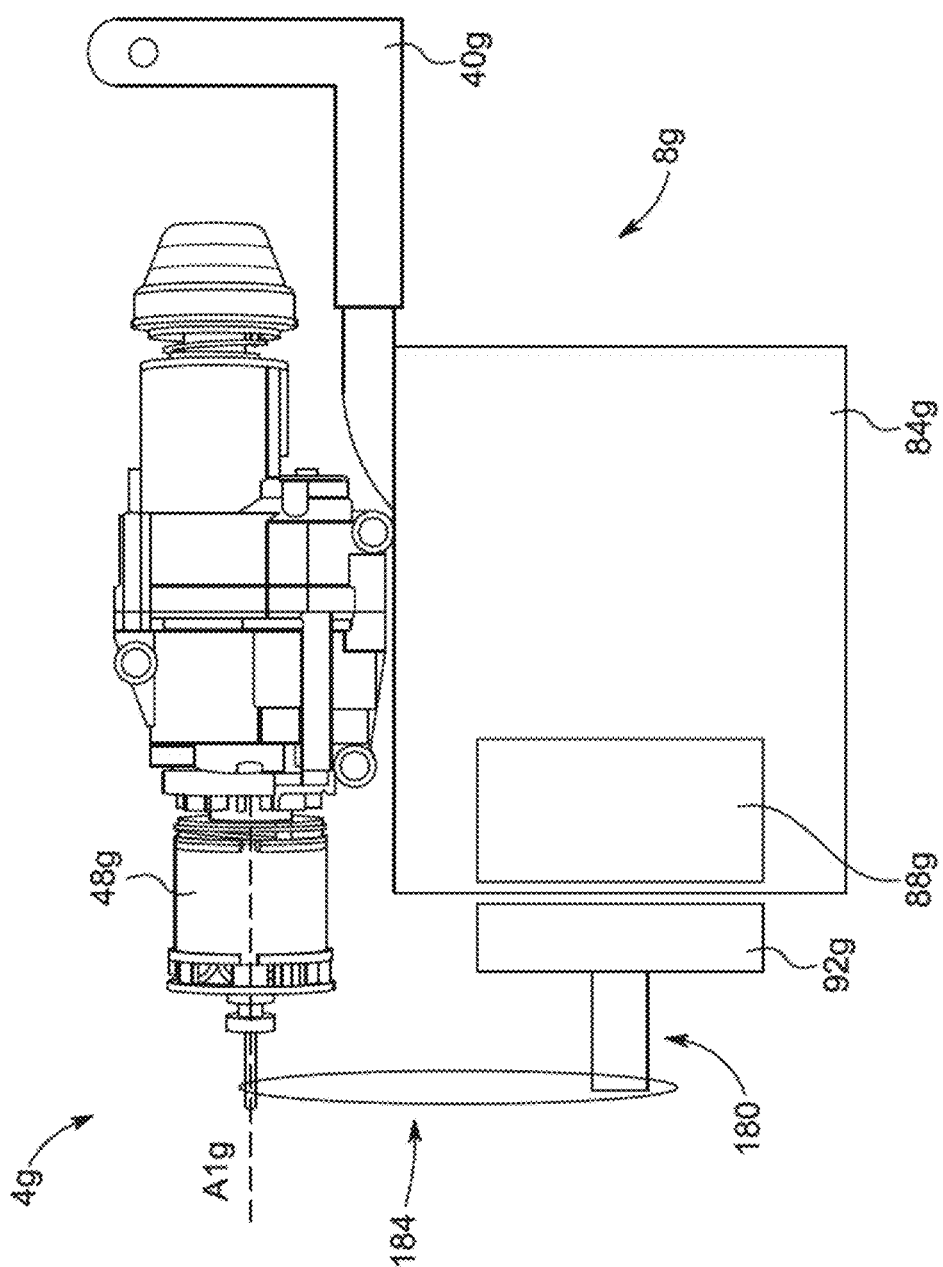
FIG. 10 is a schematic illustration of a rotary hammer including an integrated dust collection assembly according to yet another embodiment.

FIG. 10 illustrates yet another embodiment of a rotary hammer 4g with an integrated dust collection assembly 8g, with like parts having like reference numerals plus the letter "g", and the following differences explained below. The suction fan 92g is located on a suction fan drive shaft 180, separate from the motor 48g. The suction fan drive shaft 180 is parallel to the motor axis A1g. A belt or chain 184 couples the suction fan drive shaft 180 to the motor 48g and allows the motor 48g to drive the suction fan 92g. Advantageously, the suction drive of this embodiment allows for different rotational speeds of the motor 48g and suction fan 92g.

Figure 11:
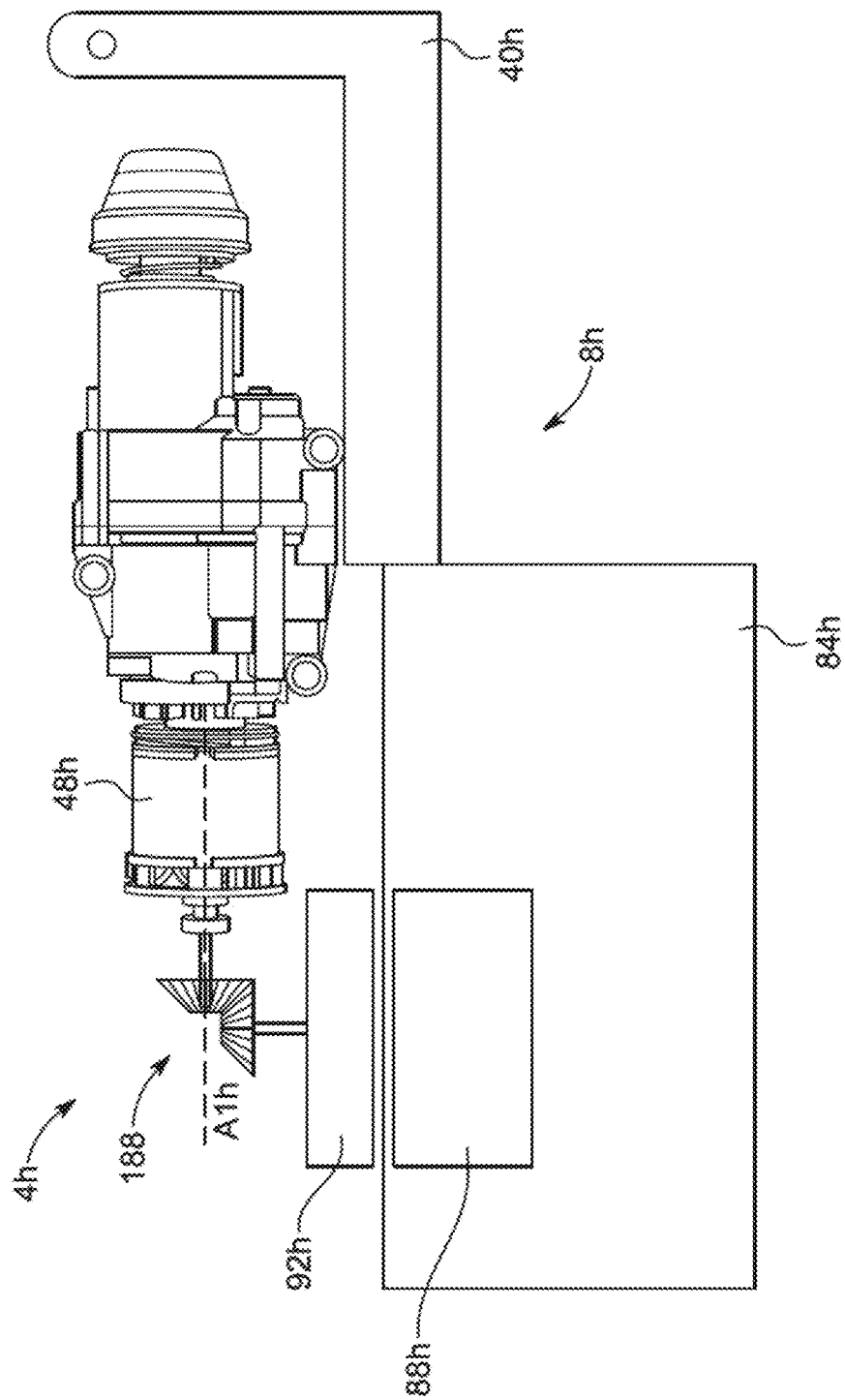
FIG. 11 is a schematic illustration of a rotary hammer including an integrated dust collection assembly according to yet another embodiment.

FIG. 11 illustrates yet another embodiment of a rotary hammer 4h with an integrated dust collection assembly 8h, with like parts having like reference numerals plus the letter "h", and the following differences explained below. The suction fan 92h is oriented perpendicular to the motor axis A1h and driven through a bevel gear train 188.

Figure 12:
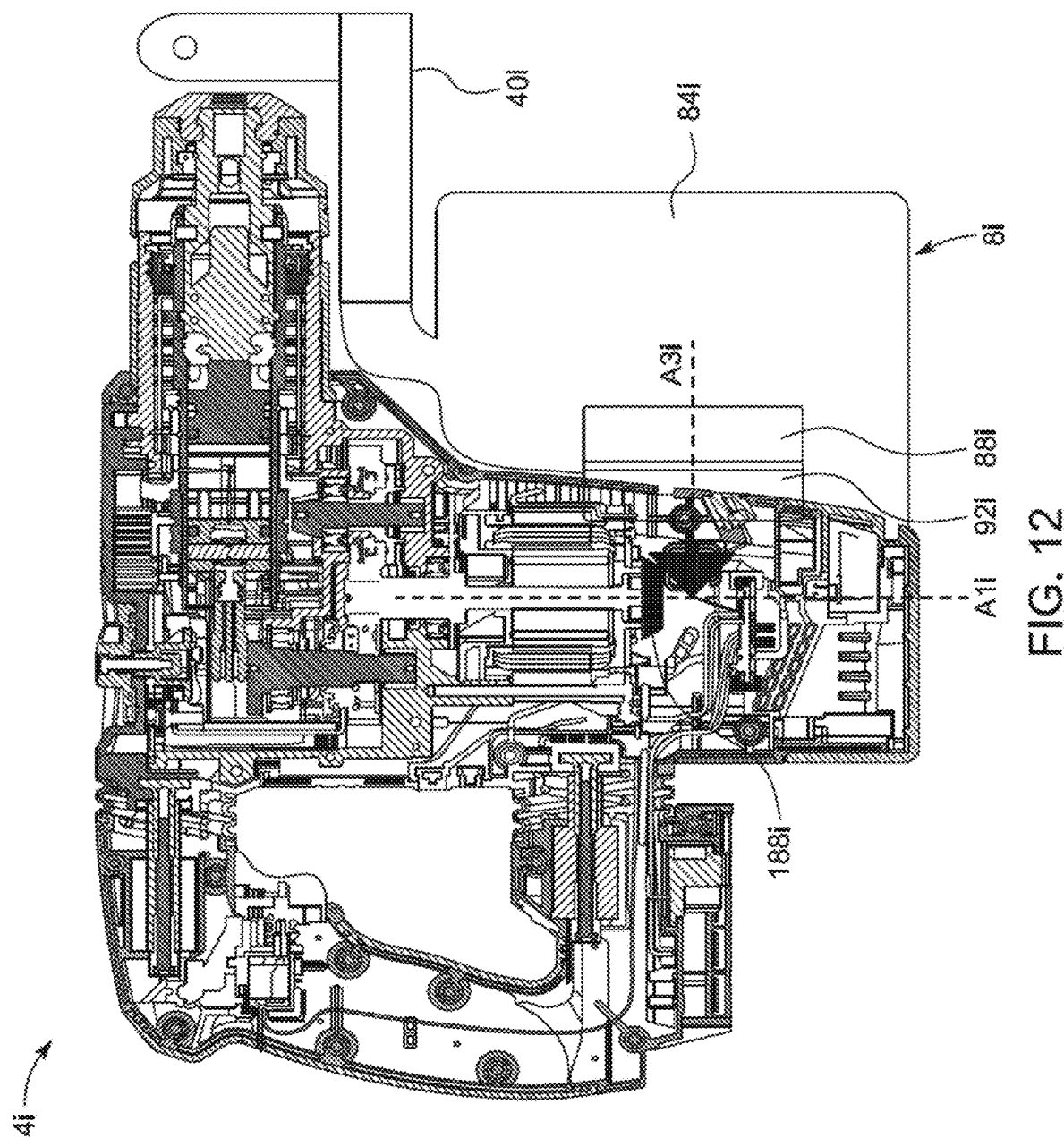
FIG. 12 is a schematic illustration of a rotary hammer including an integrated dust collection assembly according to yet another embodiment.

FIG. 12 illustrates yet another embodiment of a rotary hammer 4i with an integrated dust collection assembly 8i, with like parts having like reference numerals plus the letter "i", and the following differences explained below. The dust collection assembly 8i is oriented similar to the embodiment of FIG. 6; however, the suction fan 92i is oriented perpendicularly to the motor axis A1i and driven through a bevel gear train 188i.

Figure 13:
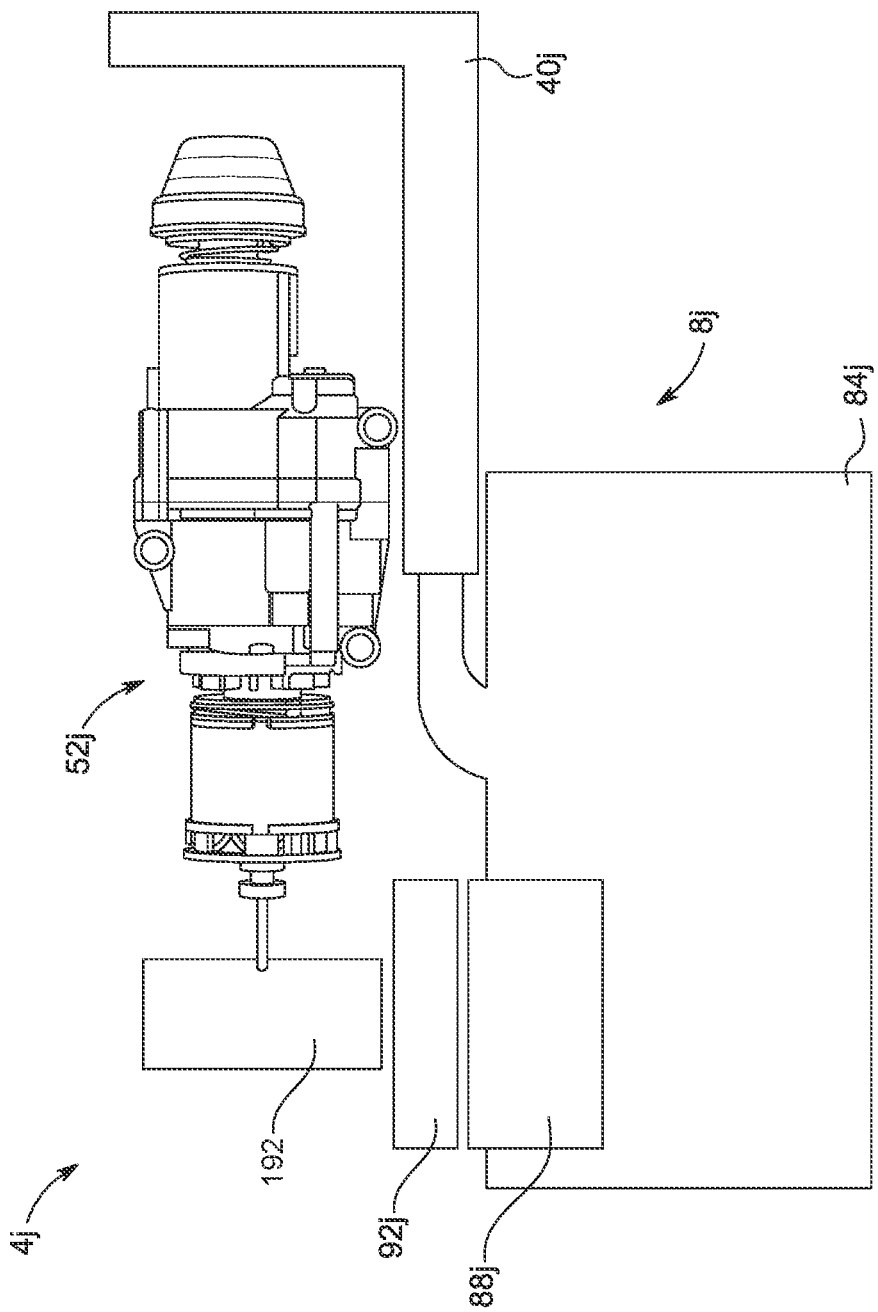
FIG. 13 is a schematic illustration of a rotary hammer including an integrated dust collection assembly according to yet another embodiment.

FIG. 13 illustrates yet another embodiment of a rotary hammer 4j with an integrated dust collection assembly 8j, with like parts having like reference numerals plus the letter "j", and the following differences explained below. A second motor 192 is disposed within the housing 12j for driving the suction fan 92j of the dust collection assembly 8j. Advantageously, this embodiment allows for independent control of the dust collection assembly 8j and drive assembly 52j speeds. In this embodiment, the dust collection assembly 8j is operable even when the drive assembly 52j is not engaged.

Figure 15:
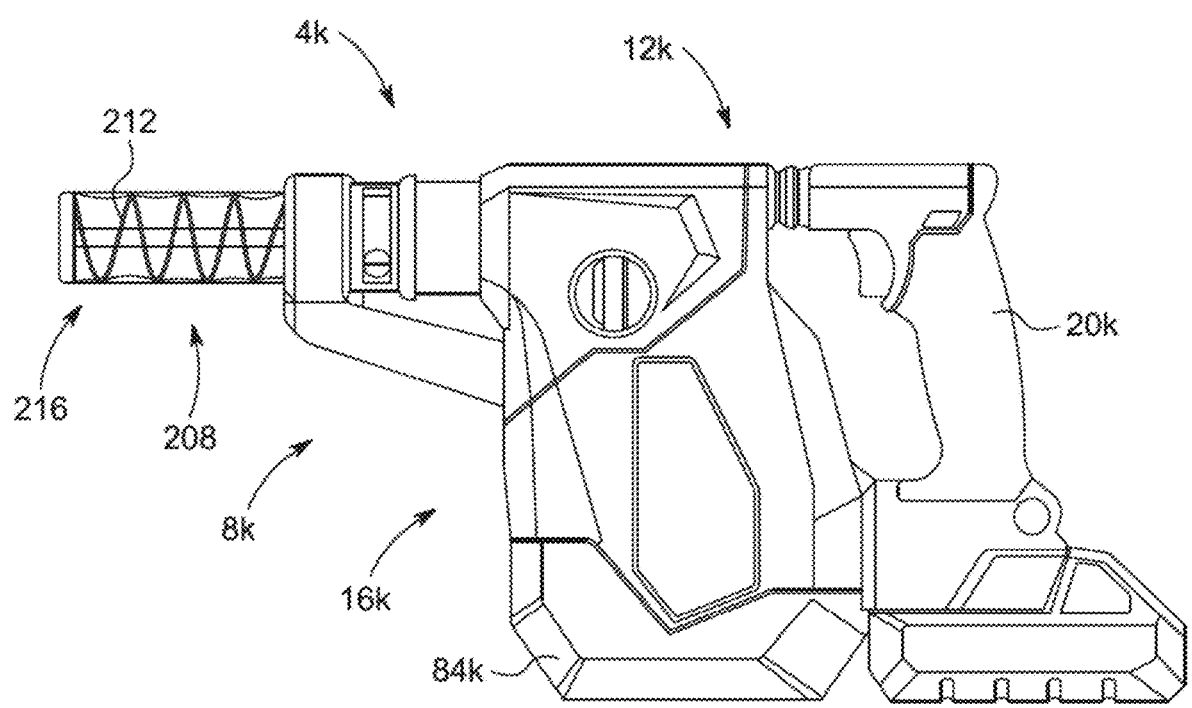
FIG. 15 is a side view of a rotary hammer including an integrated dust collection assembly according to yet another embodiment.
Figure 16:
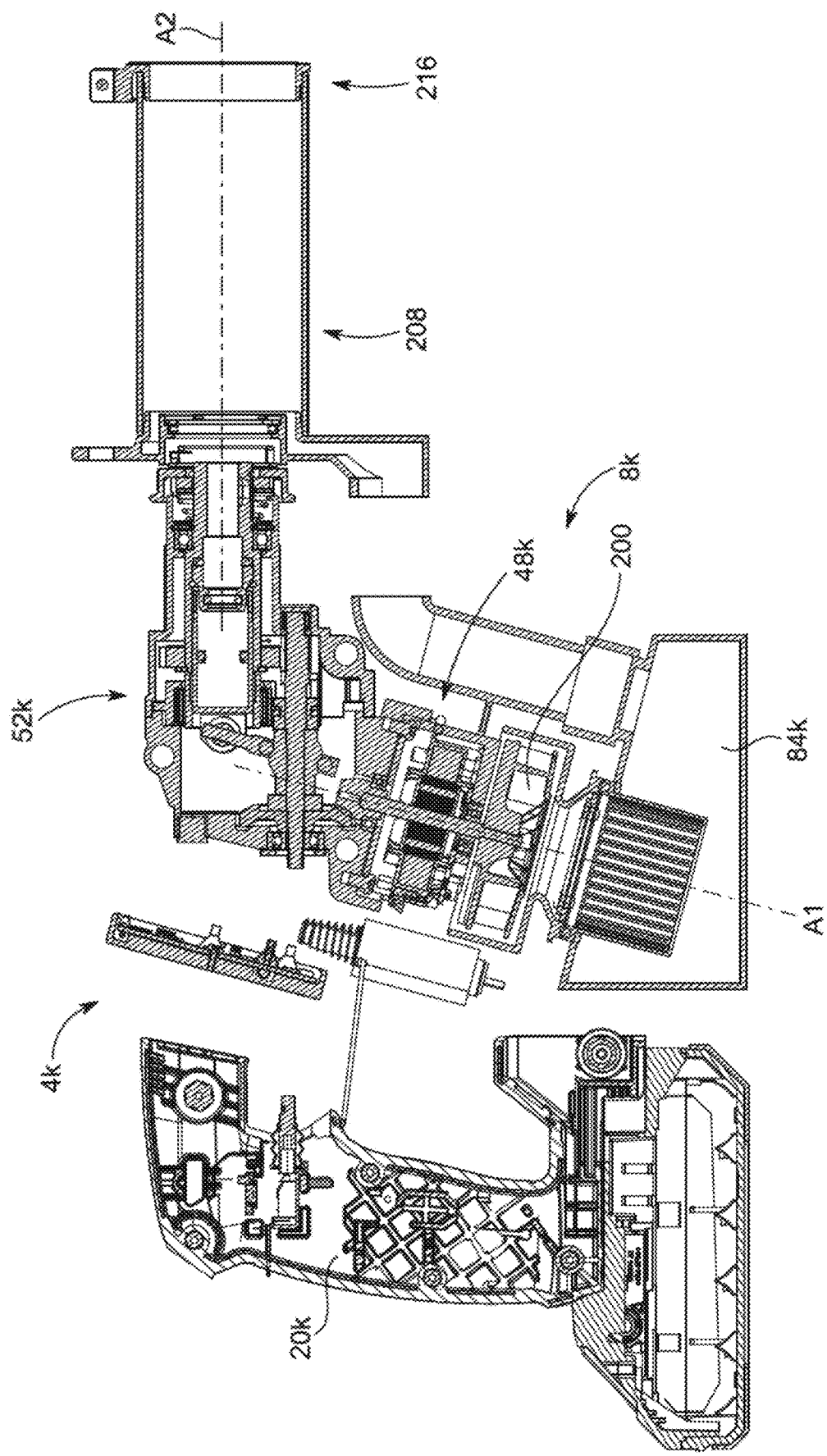
FIG. 16 is a side view of the rotary hammer of FIG. 15, with portions of the rotary hidden for clarity.

FIGS. 15-18 illustrate yet another embodiment of a rotary hammer 4k with an integrated dust collection assembly 8k, with like parts having like reference numerals plus the letter "k", and the following differences explained below. Referring to FIG. 15, the rotary hammer 4k includes a housing 12k having a main body 16k and a handle 20k extending rearward of the main body 16k. Referring to FIG. 16, disposed within the main body 16k are a motor 48k, a drive assembly 52k, and a fan 200. Each of the drive assembly 52k and the fan 200 are operatively coupled to the motor 48k for receiving torque from the motor 48k. The motor 48k is oriented within the main body 16k to be non-parallel with the working axis A2 of the rotary hammer 4k. In particular, the motor 48k is oriented such that the motor axis A1, defined as the rotational axis of the motor 48k, is transverse to the working axis A2 of the rotary hammer 4k. In some embodiments, the motor 48k may be oriented such that the motor axis A1 is vertically oriented and perpendicular to the working axis A2. The main body 16k of the rotary hammer 4k supports the dust container 84k at a lower half such that the motor 48k, the fan 200, and the dust container 84k are aligned along the motor axis A1 with the fan 200 disposed between the motor 48k and the dust container 84k.

Figure 17:
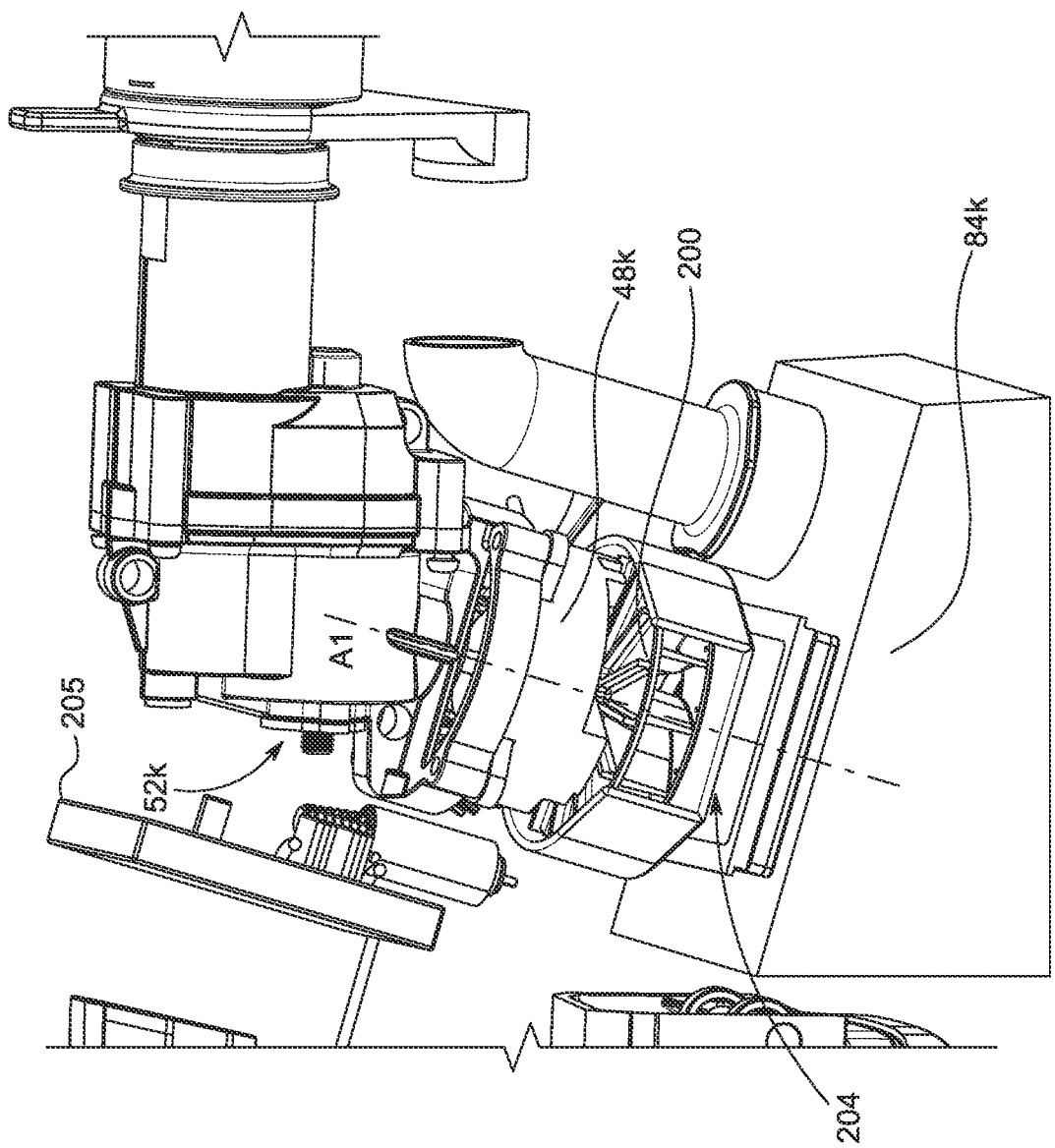
FIG. 17 is detail view of a portion of the rotary hammer of FIG. 15 illustrating the motor and fan.
Figure 18:
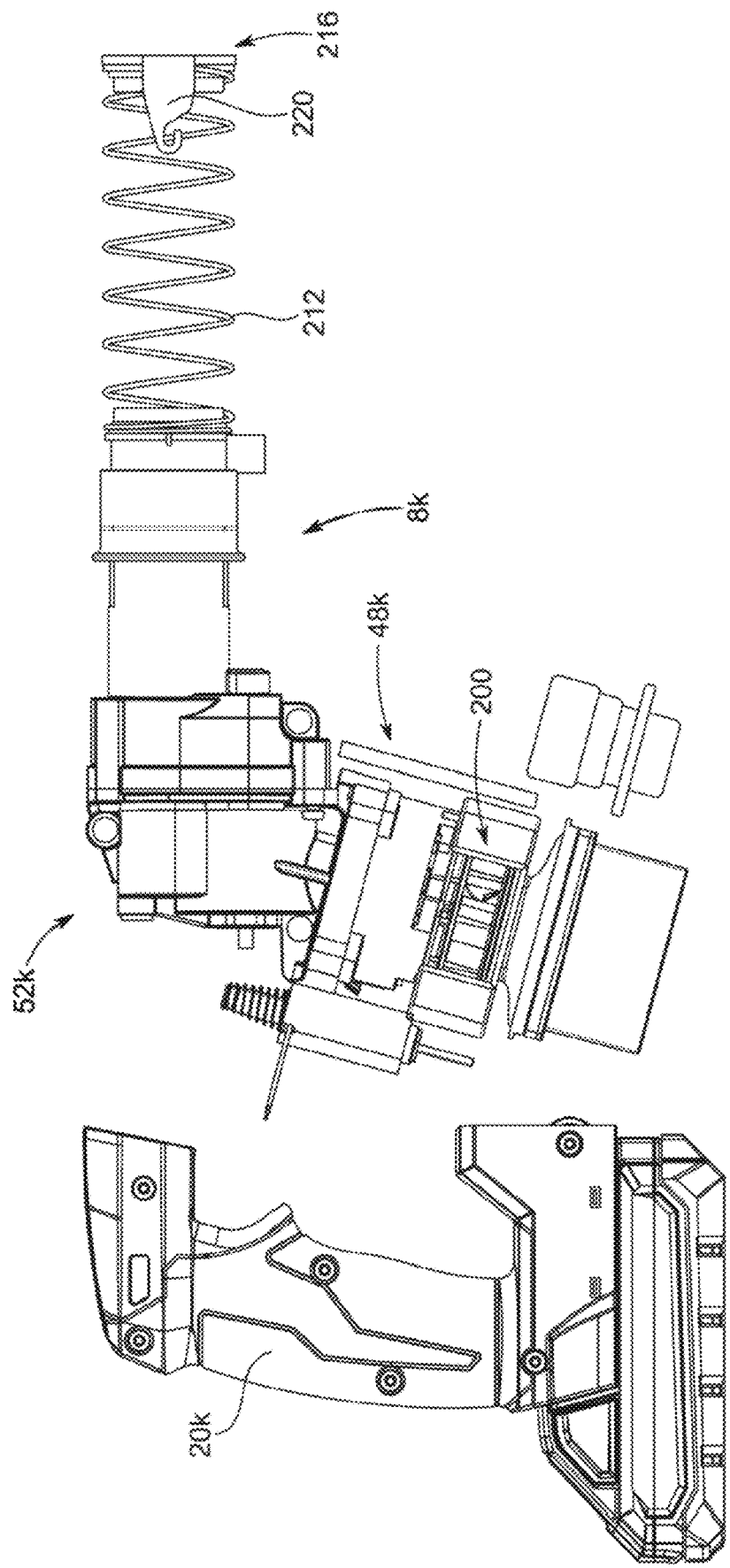
FIG. 18 is a side view of the rotary hammer of FIG. 15 with portions of the rotary hammer hidden for clarity.

With reference to FIG. 17, the fan 200 is a bi-axial fan. Torque from the motor 48k causes rotation of the fan 200 which draws air towards the fan 200. In the illustrated embodiment, air enters the fan 200 along the rotational axis A1 of the fan 200 from two opposing directions, as shown by the arrows in FIG. 17. Specifically, a first air flow enters the fan 200 from a top side of the fan 200 while a second air flow enters the fan 200 from a bottom side of the fan 200. Once the air reaches the fan 200, the air is directed radially outwards from the fan 200 to be exhausted. In particular, the fan 200 draws cooling air into the rotary hammer 4K through openings in the housing of the rotary hammer 4K. The cooling airflow is then drawn over the motor 48k to cool the motor 48K. The fan 200 may further draw cooling air across a controller 205 to cool the controller 205. After passing one or both the motor 48K and the controller 205, the cooling airflow enters the fan 200 from a top side of the fan 200.

The fan 200 also creates a suction air flow in which air is directed through the dust collection assembly 8k toward the fan 200, in an opposite direction of the cooling air flow, before being directed radially out the exhaust 204. Rotation of the fan 200 simultaneously creates the motor cooling air flow and the suction air flow. In some embodiments, the cooling air flow and the dust extraction air flow may be two separate streams of air, which are isolated from one another until merging within the fan 200 and being exhausted together as a merged air flow stream. In some embodiments, the cooling air flow is directed over other components (e.g., circuit boards) of the rotary hammer 4k to cool these components as well. As will be described in greater detail later, the suction air flow draws dust and/or debris into the dust container.

Figure 19:
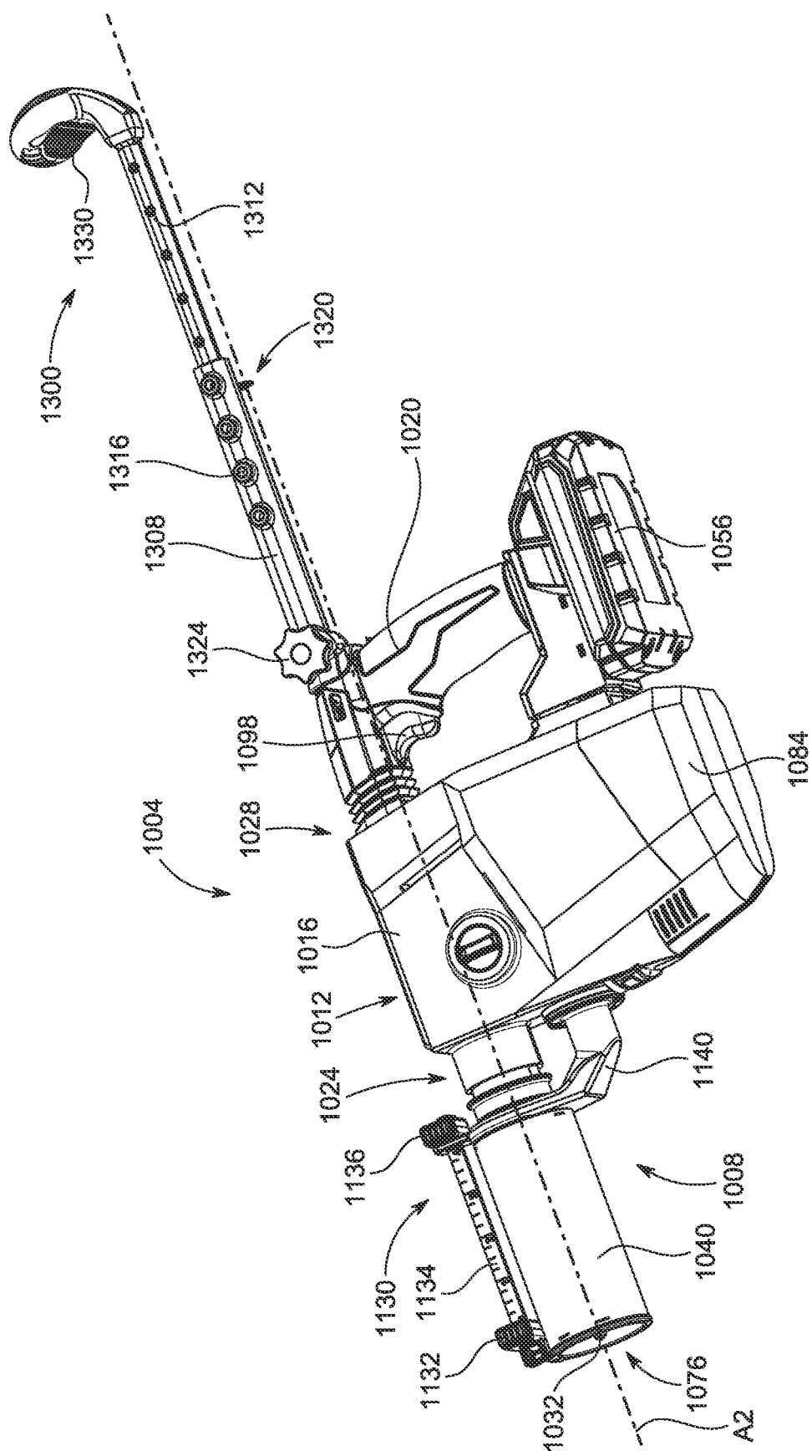
FIG. 19 is a first perspective view of a rotary hammer including an integrated dust collection assembly according to yet another embodiment.

With reference to FIGS. 15-18, the dust collection assembly 8k includes a collapsible suction pipe 208 in place of the telescoping suction pipe 40. The collapsible suction pipe 208 is configured to be selectively coupled to the housing 12k of the rotary hammer 4k and to surround the tool bit 32k. In other words, the dust collection assembly 8k utilizes an over-bit suction pipe 208. In the illustrated embodiment, the collapsible suction pipe 208 is secured to the housing 12k via a snap fit. However, other securement methods, such as a threaded connection or a latch connection, will be understood by one of ordinary skill in the art to perform the same function as the snap fit and may be used in place of the snap fit. With reference to FIG. 19, the collapsible suction pipe 208 includes a biasing member 212, illustrated as a spring, configured to bias the suction pipe 208 to an extended state. As the tool bit 32k is inserted into a workpiece, a front end 216 of the suction pipe 208 will engage the workpiece. Further insertion of the tool bit 32k into the workpiece results in the suction pipe 208 collapsing, or folding, against the force of the spring 212 while the front end 216 maintains contact with the workpiece. The entirety of the collapsible suction pipe 208 remains outside of the housing 12k of the rotary hammer 4k, even when collapsed, thereby creating more room for the other components of the rotary hammer 4k within the housing 12k without increasing the overall size of the housing 12k.

In some embodiments, the collapsible suction pipe 208 further includes a locking mechanism 220, illustrated as a hook, to selectively secure the collapsible suction pipe 208 in the collapsed state. When collapsed, the hook 220 engages a corresponding lock on the housing 12k to counteract the force from the biasing spring 212. Securement of the suction pipe 208 in the collapsed state allows for easy changing of the tool bit 32k without removal of the collapsible suction pipe 208 from the housing 12k.

When the collapsible suction pipe 208 is secured to the housing 12k, an uninterrupted fluid pathway is formed between an opening in the front end 216 of the suction pipe 208 and the fan 200. Therefore, the suction air flow draws dust and/or debris created by the tool bit 32k through the collapsible suction pipe 208 and into the dust container 84k before the air is combined with the motor cooling air flow to be expelled through the exhaust 204.

Figure 20:
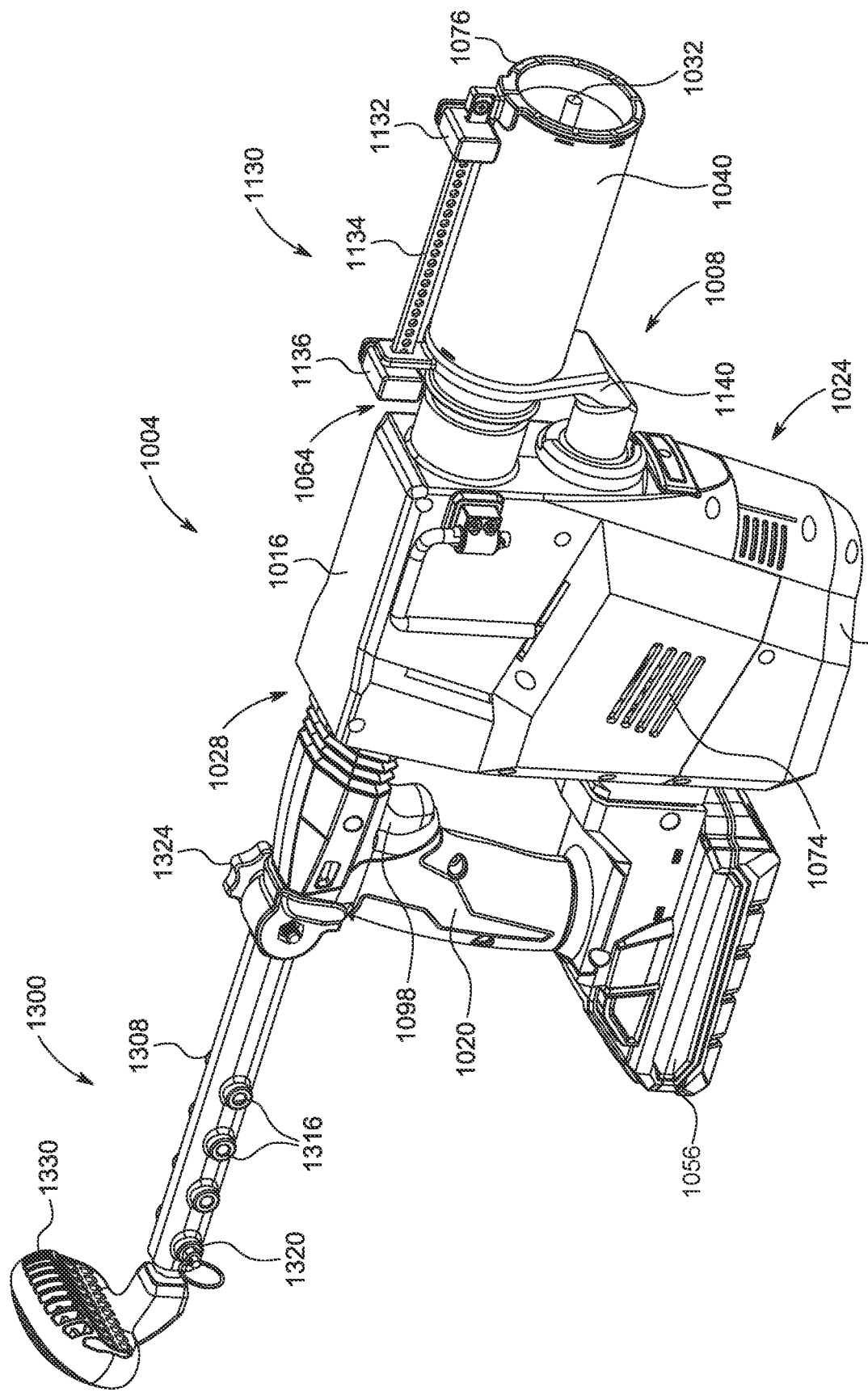
FIG. 20 is a second perspective view of the rotary hammer shown in FIG. 19.
Figure 21:
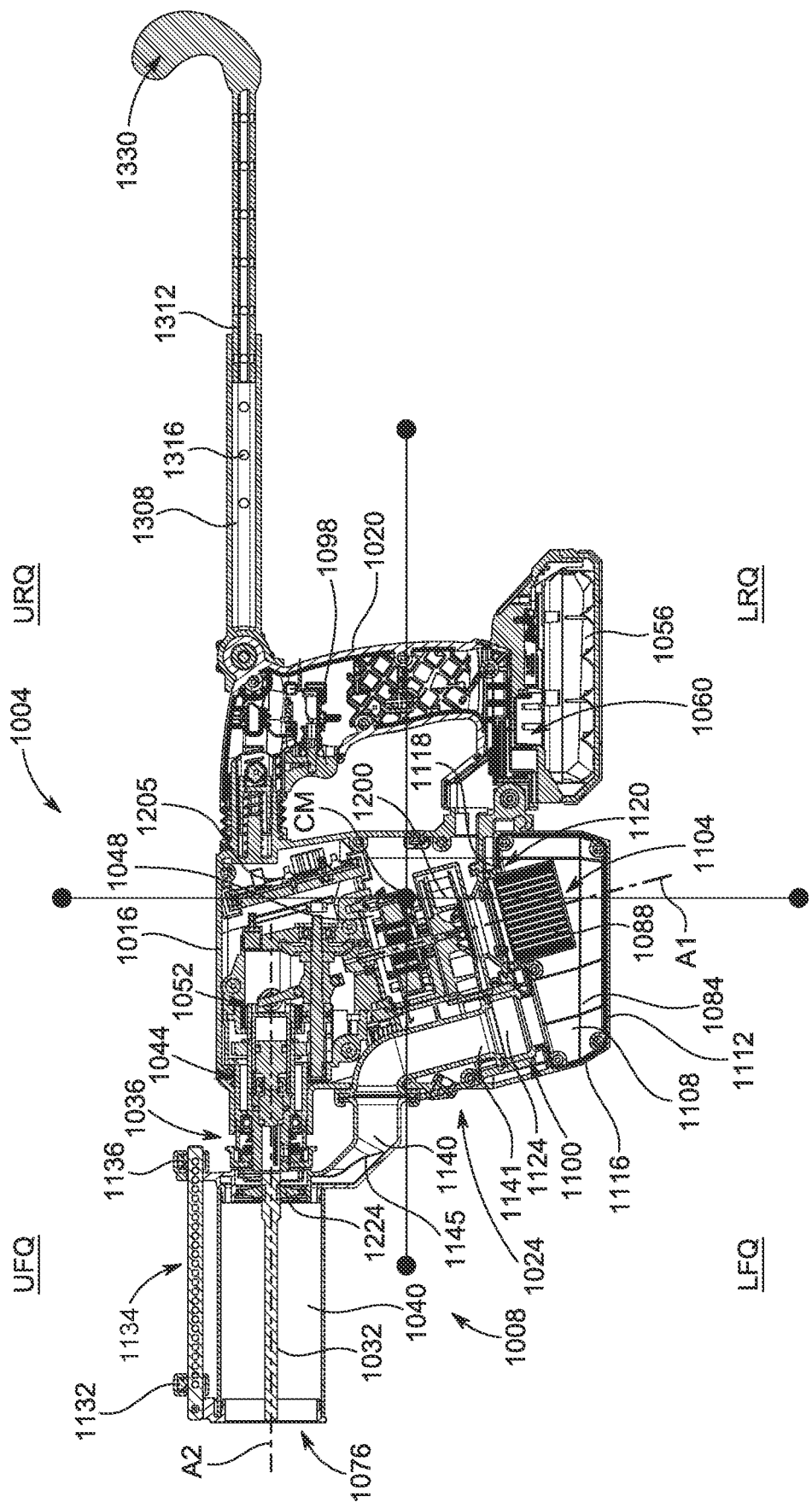
FIG. 21 is a cross-sectional view of the rotary hammer of FIG. 20.

FIGS. 19-21 illustrate a power tool, such as a rotary hammer 1004, according to another embodiment of the present disclosure. The illustrated rotary hammer 1004 includes a dust collection assembly 1008 integrated within the body of the tool. In some embodiments, one or more portion of the dust collection assembly 1008 may be realized as a separate element from the rotary hammer 1004 or may be positioned externally of the rotary hammer 1004.

The rotary hammer 1004 includes a housing 1012 having a main body 1016 and a handle 1020 extending rearward of the main body 1016. The main body 1016 includes a first end 1024 to which a tool accessory may be coupled, and a second end 1028 from which the handle 1020 extends. The tool accessory may be, for example, a tool bit 1032, a polisher, a sander, a grinder, a cutter, or any other accessory intended to operate on a worksurface, which may result in dust being expelled during machining operation of the rotary hammer 1004. The tool bit 1032 may be received within a chuck assembly 1036 formed in the first end 1024 of the main body 1016. The tool bit 1032 defines a working axis A2 (FIG. 21) of the rotary hammer 1004. The handle 1020 includes a trigger 1098 adapted to actuate the rotary hammer 1004. In the illustrated embodiment, the trigger 1098 is disposed on the handle 1020 in a position proximate the working axis A2 of the rotary hammer 1004. In other words, the vertical position (i.e., the vertical direction as shown in the figures) of the trigger 1098 along the handle 1020 is close to or along the working axis A2 of the rotary hammer 1004. This allows the trigger 1098 to be generally aligned with the tool bit 1032 so that user's finger is also aligned with the tool bit 1032.

In some embodiments, the rotary hammer 1004 may be equipped with an auxiliary handle 1300, which is selectively coupled to a rear of the handle 1020. The auxiliary handle 1300 may help the user control the rotary hammer 1004, particular when engaging in overhead drilling or when positioned at an awkward angle relative to a working surface. For example, the auxiliary handle 1300 may function as an extension arm, which allows the user to reach farther away while still being able to hold and support the rotary hammer 1004. On the other hand, the auxiliary handle 1300 also allows the user to hold the rotary hammer 1004 closer to the user's body so that the user does not have to extend his/her arms out as far. Holding the rotary hammer 1004 closer to the user's body provides for a more secure and steady support of the rotary hammer 1004. Furthermore, like the trigger 1098, the auxiliary handle 1300 is aligned generally along the working axis A2 of the rotary hammer 1004. This arrangement provides for better aim and control of the working axis A2 all the way from one end to the other end of the rotary hammer 1004. In other words, the user has greater control and stability over the orientation of the working axis A2 and can more easily adjust and/or maintain the angle of the working axis A2 relative to the worksurface.

Figure 29:
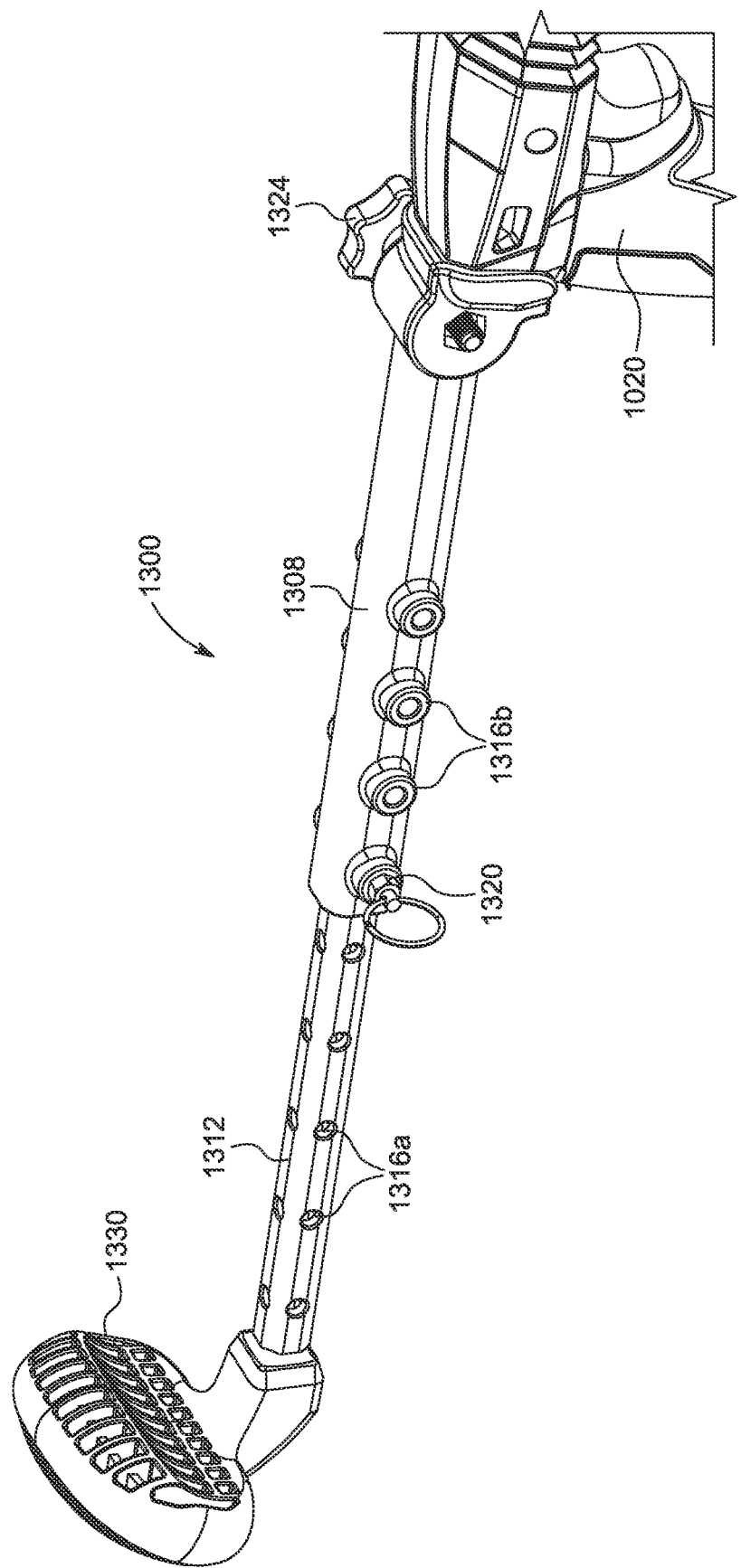
FIG. 29 is an auxiliary handle according to one embodiment.
Figure 30:
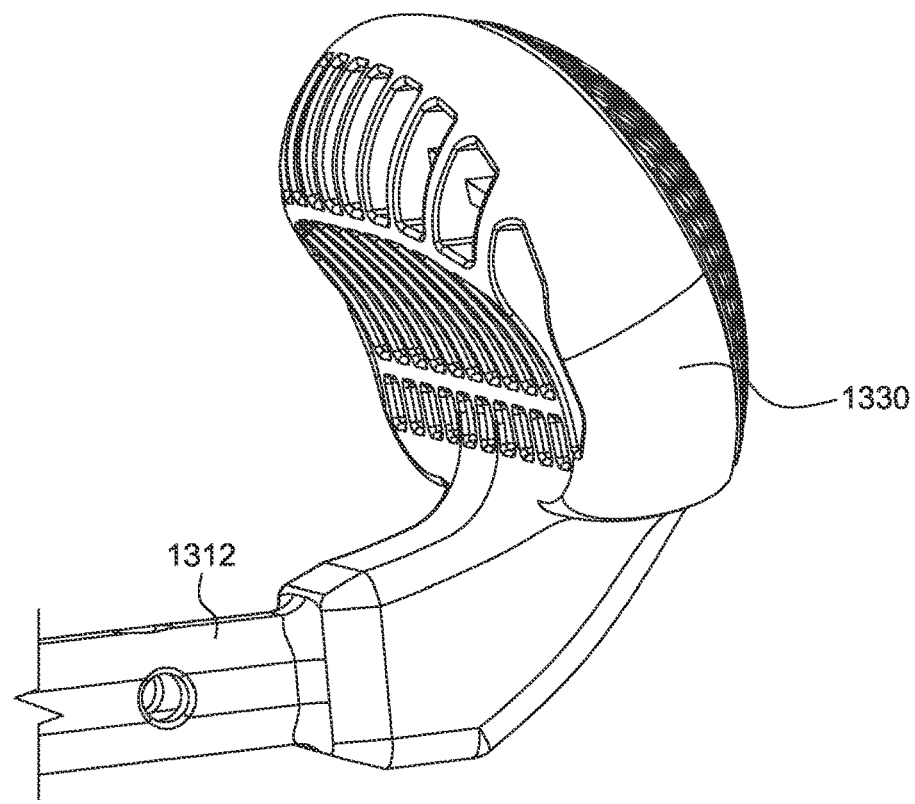
FIG. 30 is a detailed view a portion of the auxiliary handle.
Figure 31:
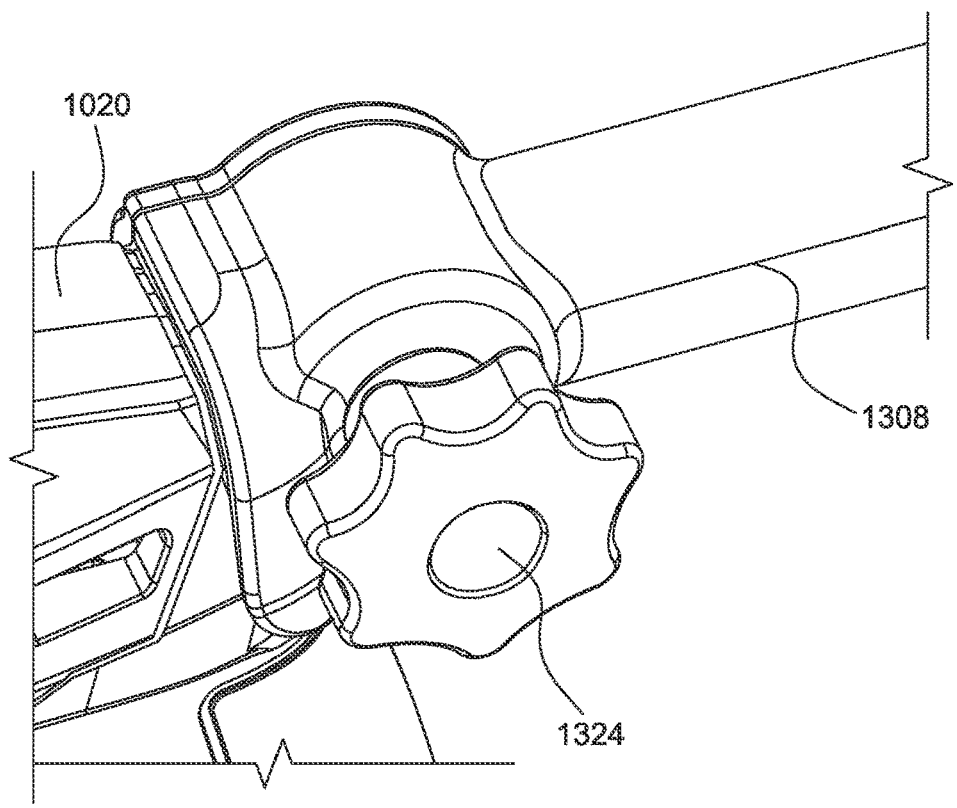
FIG. 31 is a detailed view of a connection between the auxiliary handle and the rotary hammer.

FIGS. 29-31 provide detailed views of the auxiliary handle 1300. The auxiliary handle 1300 includes a curved grip 1330, which allows a user to grasp the grip 1330 in the palm of their hands and wrap their fingers around toward the front of the grip. This style of grip allows the user to grip the auxiliary handle 1300 directly from behind to help support the weight of the rotary hammer 1004 when engaging in overhead drilling. Additionally, because the user may hold the curved grip 1330 directly from behind, it is also easier to maneuver the rotary hammer without twisting or torque their wrist. The illustrated auxiliary handle 1300 includes a telescoping body having a first shaft 1308 and a second shaft 1312 slidable within the first shaft 1308. Accordingly, the telescoping body allows the auxiliary handle 1300 to be extended to different lengths. For example, FIG. 19 illustrates the auxiliary handle 1300 in a fully extended state, while FIG. 20 illustrates the auxiliary handle 1300 in a retracted state. However, the auxiliary handle 1300 may be extended to a plurality of different lengths between the full extended and the retracted state. Specifically, the first shaft 1308 and the second shaft 1312 include securement holes 1316 that, when aligned, allow for a securement pin 1320 to secure the second shaft 1312 relative to the first shaft 1308. This helps maintain the auxiliary handle 1300 at a desired length.

Additionally, the auxiliary handle 1300 may be rotated to a stowed position when not in use. For example, the auxiliary handle 1300 may be rotated towards the top of the rotary hammer 1004 (counter clockwise in FIG. 19) and stowed along the top surface of the main body 1016. Alternatively, the auxiliary handle may be rotated towards the rear end of the handle 1020 (clockwise in FIG. 19) and stowed along the length of the handle. This may be accomplished through a rotation lock 1324, which selectively couples the auxiliary handle 1300 to the rotary hammer 1004 at various orientations. Specifically, the rotational lock 1324 both releasably couples the auxiliary handle 1300 to the rear end of the rotary hammer 1004 and maintains the auxiliary handle 1300 in different orientations relative to the rotary hammer 1004. The rotational lock 1324 may include a hinge, which allows for rotation of the auxiliary handle 1300 relative to the rotary hammer 1004. Furthermore, the auxiliary handle 1300 may be removable from the rotary hammer 1004 altogether.

Referring to FIG. 21, the housing 1012 may be divided into quadrants defined by an upper half, a lower half, a front half, and a rear half. In the illustrated embodiment, the upper half begins proximate the electric motor 1048. Additionally, in the illustrated embodiment, the front half begins at the first end 1024 of the housing 1012 and extends to a midway point between the first end 1024 of the main body 1016 and a rear end of the handle 1020. Accordingly, this provides for an upper front quadrant (UFQ), an upper rear quadrant (URQ), a lower front quadrant (LFQ), and a lower rear quadrant (LRQ). In the illustrated embodiment, a center of mass CM of the tool is positioned proximate the intersection of the upper front quadrant (UFQ), the upper rear quadrant (URQ), the lower front quadrant (LFQ), and the lower rear quadrant (LRQ).

Figure 22:
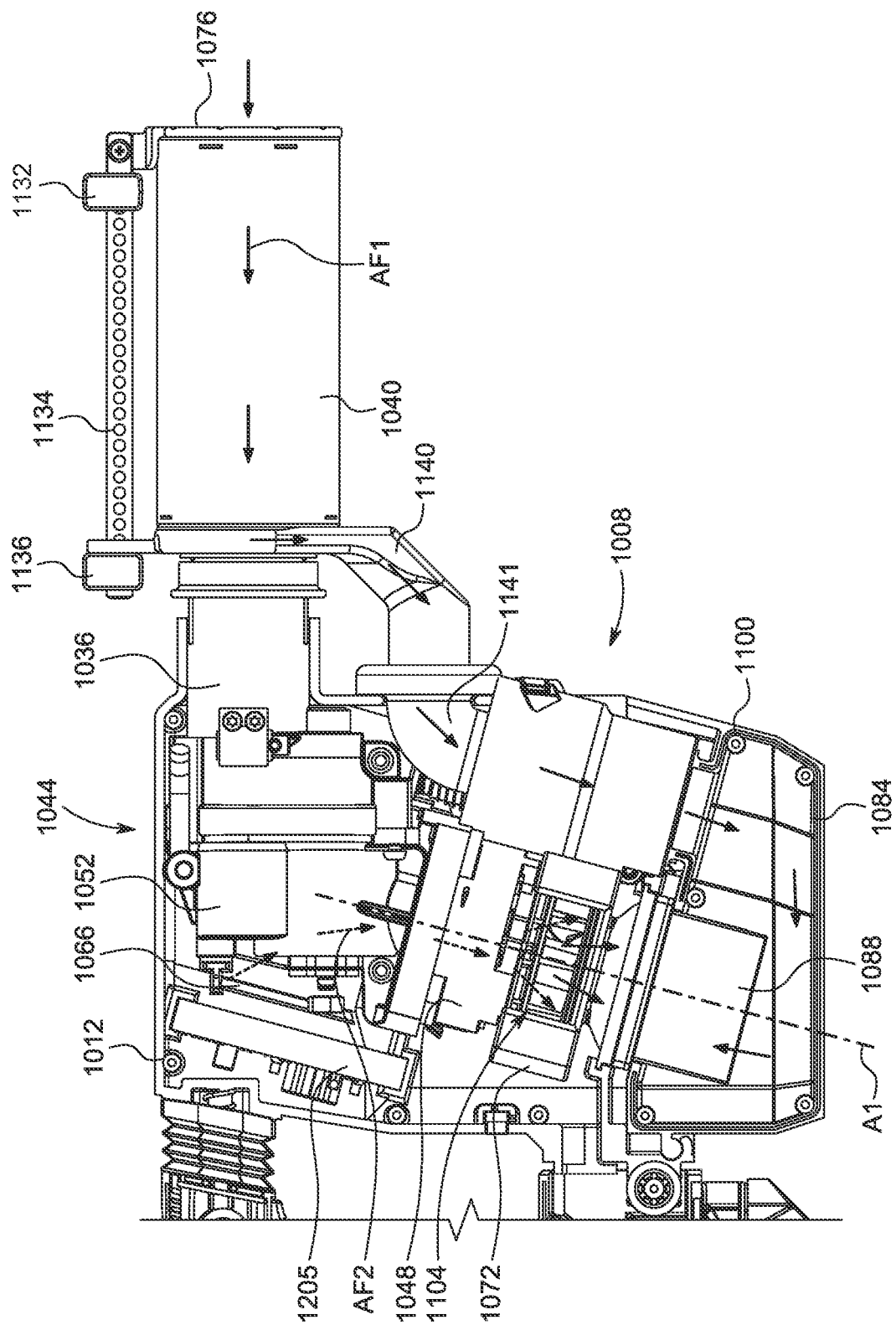
FIG. 22 is a detailed view of a drive unit and dust collection assembly from a first side.
Figure 23:
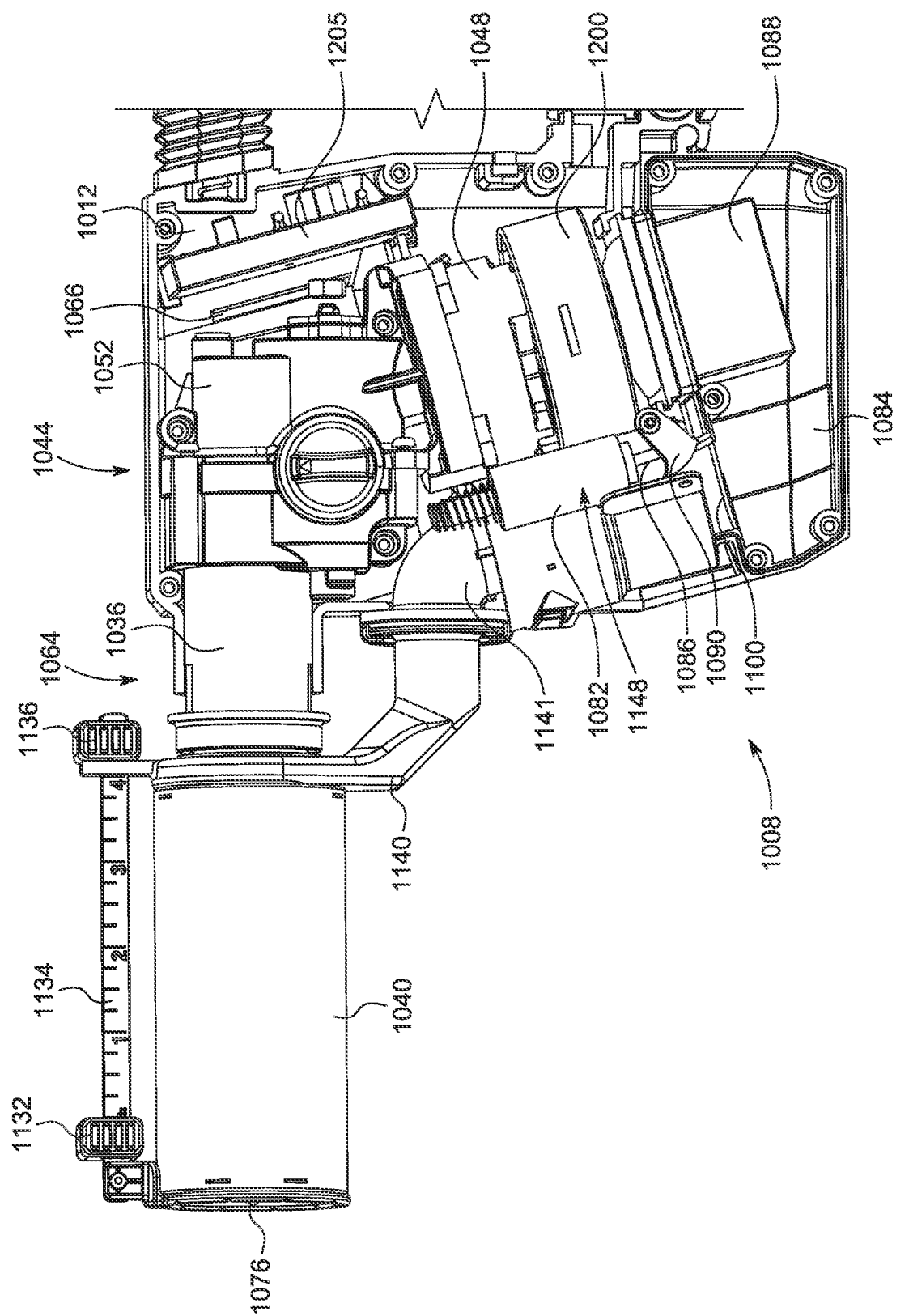
FIG. 23 is a detailed view of the drive unit and dust collection assembly from a second side.

Referring to FIGS. 21-23, a drive unit 1044 is positioned within the main body 1016 of the housing 1012. However, in other embodiments, one or more component of the drive unit 1044 may be positioned in the handle 1020. In the illustrated embodiment, the drive unit 1044 is positioned primarily within the upper half of the housing 1012. The arrangement of the drive unit 1044 provides for additional space for the dust collection assembly 1008. The drive unit 1044 includes a motor 1048 and a drive assembly 1052 operatively coupled to the motor 1048 for receiving torque from the motor 1048. The motor 1048 defines a motor axis A1 that is angled relative to the working axis A2 of the rotary hammer 1004. For example, in some embodiments, the included angle between the motor axis A1 and the working axis A2 is between 80 and 135 degrees. In some embodiments the included angle between the motor axis A1 and the working axis A2 is between 90 and 115 degrees. In some embodiments, the angle is 105 degrees. In yet other embodiments, the angle is 90 degrees so that the motor axis AI extends perpendicular to the working axis A2. The working axis A2 of the rotary hammer 1004 is defined as the axis through the tool bit 1032 and the drive assembly 1052. In the illustrated embodiment, the motor 1048 is positioned proximate the center of mass CM. In some embodiments, the motor 1048 is positioned in the front half near the center line between the upper half and the lower half of the housing 1012.

Power for the motor 1048 is provided by a battery 1056, which may be received within a battery receptacle 1060 on a bottom portion of the handle 1020. In other embodiments, the battery receptacle 1060 may be disposed within other portions of the housing 1012. In some embodiments, the battery 1056 may be a removable rechargeable battery.

Operation of the rotary hammer 1004 is controlled by a single controller 1205. The illustrated controller 1205 controls both the motor 1048 as well as the dust collection assembly 1008. However, in other embodiments, there may be two or more controllers included in the rotary hammer 1004 for separately controlling various components of the drive unit 1044 and the dust collection assembly 1008. The controller 1205 is located in the upper rear quadrant (URQ). In particular, the controller 1205 is positioned behind the drive assembly 1052 and above the motor 1048.

A fan 1200 is operably coupled to the motor 1048 and shares a rotational axis with the motor axis A1. The motor 1048 thereby drives both the drive assembly 1052 and the fan 1200. In the illustrated embodiment, the fan 1200 is positioned below the motor 1048 and the drive assembly 1052. Therefore, in the illustrated embodiment, the fan 1200 is positioned below the center of mass of the rotary hammer 1004. As will be described in further detail herein, the fan 1200 draws air along a cooling air flow path which extends across the motor 1048 to cool the motor 1048. In some embodiments, the cooling air flow path is directed over other components (e.g., controller 1205, circuit boards) of the rotary hammer 1004 to cool these components as well. Simultaneously, the fan 1200 draws air along a suction air flow path to draw dust and/or debris into the dust collection assembly 1008. However, in other embodiments, there may be two separate fans generating a cooling air flow and a dust collection air flow.

The rotary hammer 1004 also includes a dust collection assembly 1008. In the illustrated embodiment, the dust collection assembly 1008 is integrated within the main body 1016 of the rotary hammer 1004. However, in other embodiments, one or more part of the dust collection assembly 1008 may be positioned within the handle 1020 or externally of the housing 1012. The dust collection assembly 1008 includes a nozzle 1076, a dust tube 1040, a dust container 1084, a filter 1088, and the fan 1200.

Figure 24:
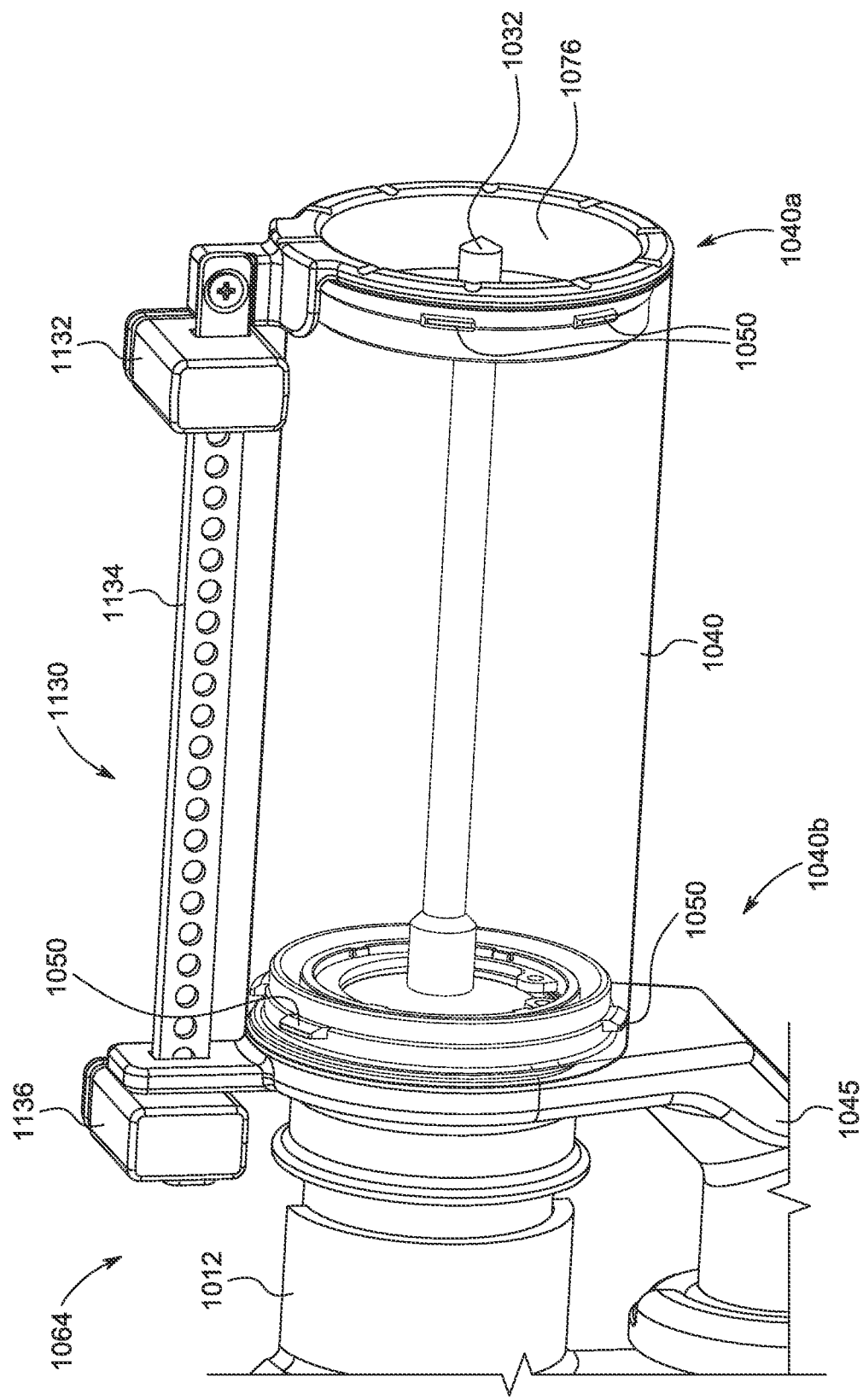
FIG. 24 is a detailed view of a dust tube.

As shown in FIG. 24, the nozzle 1076 is located at a first end 1040a of the dust tube 1040. The nozzle 1076 and the dust tube 1040 surround at least a portion of the tool bit 1032 of the rotary hammer 1004. In other words, the dust collection assembly 1008 utilizes an over-bit dust tube 1040. Additionally, in the illustrated embodiment, the dust tube 1040 is a collapsible style suction tube. In other words, the dust tube 1040 is composed of a compressible material that may expand and collapse in an accordion style manner. A spring, such as the spring 212, biases the dust tube 1040 towards an expanded position. As the tool bit 1032 is inserted into a workpiece, the nozzle 1076 will engage the workpiece. Further insertion of the tool bit 1032 into the workpiece results in the dust tube 1040 collapsing, or folding, against the force of the spring 212 while the nozzle 1076 maintains contact with the workpiece.

In some embodiments, a depth stop 1130 is coupled to the dust tube 1040 to limit the extent to which the tool bit 1032 can be inserted into a workpiece. The depth stop 1130 includes a plunge depth stop 1132, which limits the extent to which the dust tube 1040 may retract, and in turn, limits the extent to which the tool bit 1032 can plunge into the workpiece. The plunge depth stop 1132 is movable along a length of a rule 1134 coupled to the dust tube 1040 and is selectively fixed to limit the extent to which the dust tube 1040 may retract. Also included on an extension stop 1136. The extension stop 1136 limits the extent to which the dust tube 1040 may extend by selectively fixing to the rule 1134. This feature can be used to adjust an extension length of the dust tube 1040 to correspond to the size of the tool bit 1032 being used. Furthermore, in some embodiments, the suction tube 1040 may not include a depth stop 1130 at all, or may only include one of the plunge depth stop 1132 or the extension stop 1136.

Furthermore, in some embodiments, the dust tube 1040 may also be equipped with a locking mechanism 220, as shown in an earlier embodiment, to maintain the dust tube 1040 in a collapsed state. However, in other embodiments, the dust tube 1040 may be a sliding style suction tube or a telescoping suction tube (e.g., as shown in FIGS. 3A and 3B) rather than a collapsible suction tube. Additionally, in other embodiments, the dust tube 1040 may be arranged adjacent to the tool bit 1032 instead of being configured as an over-bit dust tube 1040. For example, the dust tube 1040 may be arranged above, below, or on the side of the tool bit 1032 with only the nozzle 1076 extending over the tool bit 1032.

With continued reference to FIG. 24, a first end of the dust tube 1040 is coupled to the nozzle 1076 and a second end 1040*b* of the dust tube 1040 is coupled to the housing 1012 of the rotary hammer 1004. In the illustrated embodiment, the second end 1040*b* of the dust tube 1040 is coupled to the housing 1012 via an exterior transfer tube 1140. The dust tube 1040 is secured to the nozzle 1076 and exterior transfer tube 1140 by tabs 1050 which help retain and support the dust tube 1040 at each end. In turn, the exterior transfer tube 1140 is removably coupled to the housing 1012 via a combination of a snap fit and rotational connection.

Figure 25:
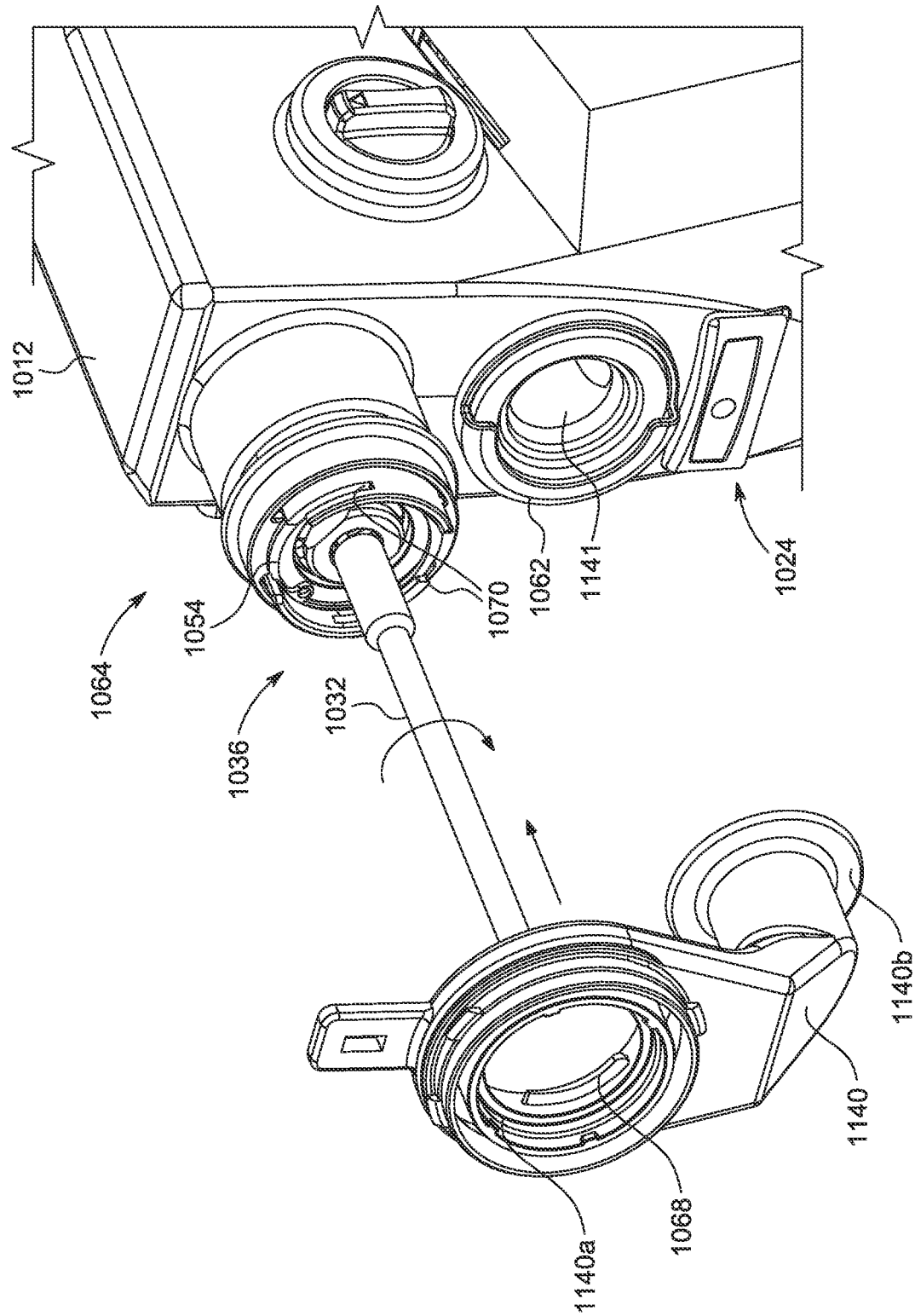
FIG. 25 is a detailed view of a portion of a dust transfer tube.

As illustrated in FIG. 25, the exterior transfer tube 1140 is first snap fit onto the first end 1024 of the housing 1012 and then rotated (e.g., clockwise in FIG. 25) to secure the exterior transfer tube 1140 to the housing 1012. Specifically, a first end 1140*a* of the exterior transfer tube 1140 is snap fit onto the housing 1012 while a second end 1140*b* of the exterior transfer tube 1140 is rotated into a locked position. The first end 1140*a* of the exterior transfer tube 1140 forms a collar, which may be is snap fit onto a nose 1064 of the rotary hammer 1004 by a snap ring 1054. The snap fit is accomplished by moving the exterior transfer tube 1140 linearly until a snap ring 1054 axially locks the first end 1140*a* of the exterior transfer tube 1140 to the housing 1012. Once secured to the housing 1012, the first end 1140*a* of the exterior transfer tube 1140 (i.e., the collar) surrounds the circumference of the nose 1064 such that the chuck assembly 1036 and/or tool bit 1032 extend through an opening in the first end 1 140*a* of the exterior transfer tube 1140.

In order to rotationally lock the exterior transfer tube 1140, the exterior transfer tube 1140 is rotated until it reaches a locked position. To accomplish this, the first end 1140*a* of the exterior transfer tube 1140 includes one or more annular projection 1068 formed within the opening of the collar which are received within corresponding annular recesses 1070 on the nose 1064 of the rotary hammer 1004 to help rotational engagement therebetween. The exterior transfer tube 1140 is rotated until the second end 1140*b* is received within an annular groove 1062 formed on the first end 1024 of the housing 1012. The annular groove 1062 prevents further rotation of the exterior transfer tube 1140 relative to the housing 1012. Furthermore, the annular groove 1062 helps align the second end 1140*b* of the exterior transfer tube 1140 with an opening in the housing 1012 that meets an internal transfer tube 1141. Together, the external transfer tube 1140 and the internal transfer tube 1141 lead dust laden air from the dust tube 1040 into the dust container 1084. The second end 1140*b* of the exterior transfer tube 1140 is fluidly connected to the internal transfer tube 1141 in order to form an airtight connection. It should be understood by one of ordinary skill in the art that other securement methods, such as a threaded or latch connection, which perform the same function as the snap fit and rotational connection may be used in the alternative.

Figure 26:
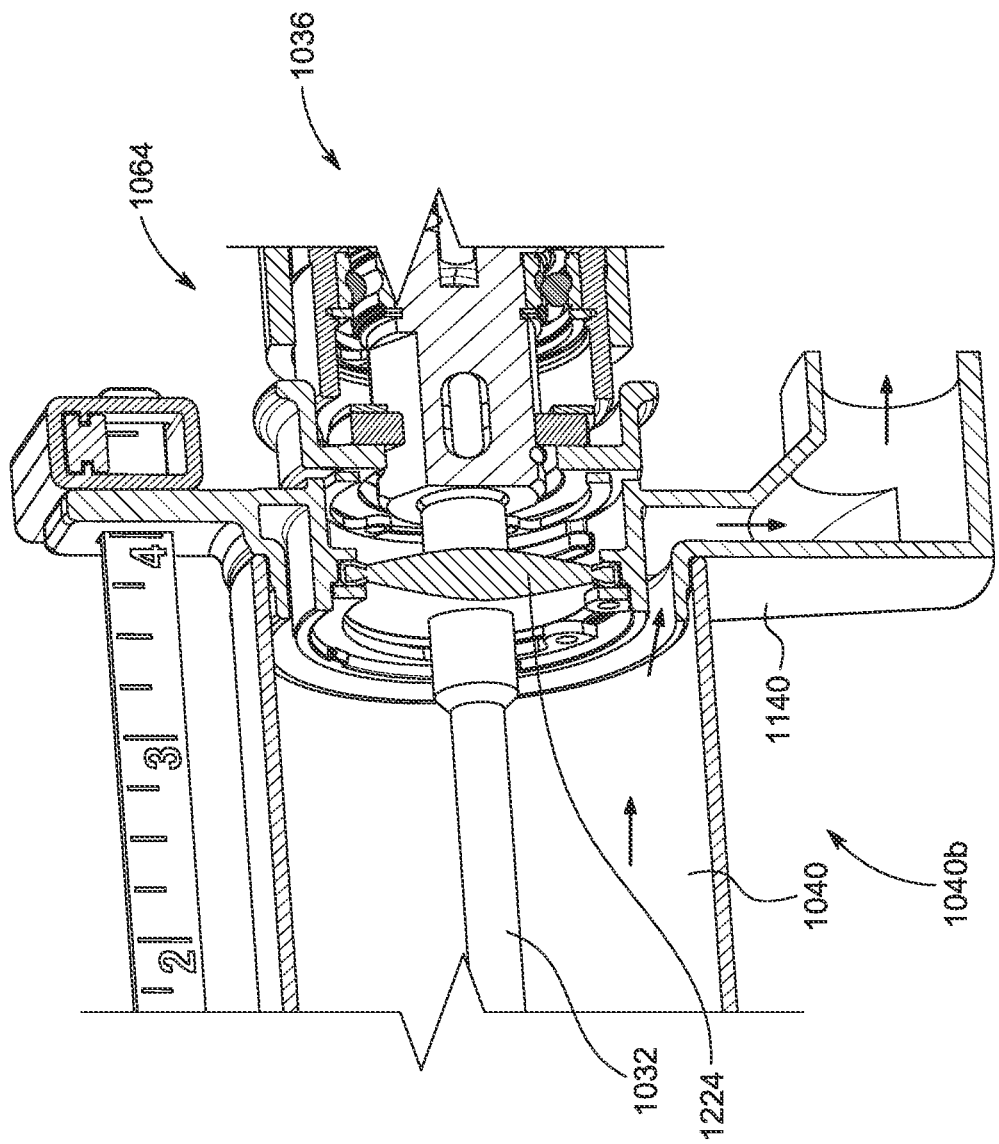
FIG. 26 is a detailed view of a connection between the dust tube and the nose of the rotary hammer.

As shown in FIG. 26, the rotary hammer 1004 includes a brush seal 1224 disposed within the dust tube 1040 to prevent dust from entering the main body 1016 via the chuck assembly 1036. In the illustrated embodiment, the brush seal 1224 is positioned proximate the second end 1040*b* of the dust tube 1040, which connects to the housing 1012. However, in other embodiments, the brush seal 1224 may be disposed within a bit retention area of the housing 1012, rather than within the dust tube 1040. In yet another embodiment, the brush seal 1224 may be disposed proximate the first end 1040*a* of the dust tube 1040. The illustrated brush seal 1224 surrounds and engages a portion of the tool bit 1032 to prevent dust and/or debris that is drawn into the dust tube 1040 from entering the housing 1012. The brush seal 1224 prevents the dust transferred via the dust extractor air flow to enter through the nose 1064 of the tool and/or the bit retention assembly 1036. Rather, air will flow through the dust tube 1040, through the exterior transfer tube 1140, through the interior transfer tube 1141, and into the dust container 1084 without entering the chamber of the main body 1016 that houses the drive unit 1044 and the controller 1205.

Referring back to FIGS. 21-23, the exterior transfer tube 1140 extends from the dust tube 1040 to the housing 1012, and the interior transfer tube 1141 extends from the exterior transfer tube 1140 to the inlet 1100 of the dust container 1084. Together, the exterior transfer tube 1140 and the interior transfer tube 1141 form the dust transfer tube 1145. As discussed, the exterior transfer tube 1140 is selectively coupled to the dust tube 1040 and the nose 1064 of the rotary hammer 1004 to create the suction air flow path for the dust extractor. The interior transfer tube 1141 extends along the first end 1024 of the main body 1016 from the upper portion to the lower portion, at which point it is coupled to the inlet 1100 of the dust container 1084.

The dust container 1084 is selectively attachable to the housing 1012. The dust container 1084 is detachable from the housing 1012 of the rotary hammer 1004 and may be removed to allow an operator to empty the dust or other debris from the dust container 1084. In the illustrated embodiment, the dust container 1084 is prevented from being secured to the housing 1012 without the filter 1088 in place. For example, the filter 1088 acts as a portion of the connection between the dust container 1084 and the housing 1012. Thus, without the filter 1088 in place, the dust container 1084 is prevented from being coupled to the housing 1012. The filter 1088 is connected to a bottom side of the fan 1200. In particular, the filter 1088 is connected to a shroud 1072 of the fan 1200 that extends around the circumference of the fan 1200 and below the fan 1200. Both the fan 1200 and the filter 1088 are positioned in the lower portion of the main body 1016 below the center of mass (CM).

The dust container 1084 includes an inlet 1100 for a dust laden air stream and an outlet 1104 defined by an outlet end of the filter 1088. More specifically, the dust container 1084 includes opposite side walls 1108 and a bottom wall 1112 extending between the side walls 1108. The dust container 1084 additionally includes end walls 1116 adjacent each of the side walls 1108 and the bottom wall 1112. An opening 1120 is defined in a top wall 1118 through which the filter 1088 is received. The top wall 1118 further includes an inlet 1100 for dust laden air. A connection port 1124 extends through the inlet 1100 to direct dust laden air from the dust tube 1040 into the dust container 1084. In some embodiments, the connection port 1124 is a DEC 26 connection. The dust container 1084 is operable to collect dust and other debris from a workpiece during drilling and/or hammering operation performed by the rotary hammer 1004 to maintain a user's work area substantially clear of dust and other debris.

As previously mentioned, the fan 1200 creates both a suction air flow path (AF1) and a cooling air flow path (AF2). The fan 1200 is a bi-axial, radial exhaust fan positioned between the motor 1048 and the filter 1088. The fan 1200 is mounted to an output shaft of the motor 1048 such that torque from the motor 1048 drives rotation of the fan 1200. Accordingly, the rotational axis of the fan 1200 is coaxial with the motor axis A1. As best shown in FIG. 22, air enters the fan 1200 along the rotational axis Al of the fan 1200 from two opposing directions. Specifically, the cooling air flow path (AF2) enters the fan 1200 from a top side of the fan 1200 while the suction air flow path (AF1) enters the fan 1200 from a bottom side of the fan 1200. Once the air from either air flow path reaches the fan 1200, the air is directed radially outwards from the fan 1200 to be exhausted.

In particular, the fan 1200 draws cooling air into the rotary hammer 1004 through inlet openings 1066 in the housing 1012 of the rotary hammer 1004. The cooling airflow (AF2) is then drawn over the motor 1048 to cool the motor 1048. In some embodiments, an inner surface of the housing 1012 includes a rib to guide the cooling airflow (AF2) into the motor 1048, thereby ensuring that the cooling airflow (AF2) passes over the motor 1048. The fan 1200 may further draw cooling air across a controller 1205 to cool the controller 1205. After passing one or both the motor 1048 and the controller 1205, the cooling airflow (AF2) enters the fan 1200 from a top side of the fan 1200 and exits radially through an outlet 1104 of the fan 1200. The cooling air flow (AF2) is then exhausted from the rotary hammer 1004 through outlet openings 1074 (FIG. 20) in the housing 1012 of the rotary hammer 1004. Specifically, the outlet 1104 is formed as a radial opening in a shroud 1072 of the fan 1200, which is aligned with the outlet openings 1074 to direct air exterior of the rotary hammer 1004. In some embodiments, the outlet openings 1074 are provided on a single side of the housing 1012, and the outlet 1104 of the shroud 1072 is provided on a single side of the housing 1012.

The fan 1200 also creates a suction air flow (AF1) in which air is directed through the dust collection assembly 1008 toward the fan 1200, in an opposite direction of the cooling air flow (AF2), before being directed radially out the exhaust 1204. In particular, air is suctioned into the nozzle 1076, through the dust tube 1040, through the dust transfer tube 1045 (i.e., the exterior transfer tube 1140 and the interior transfer tube 1141), and into the dust container 1084 where the dust is trapped. Clean air is the drawn up through the filter 1088 into the fan 1200 and exhausted through the outlet 1104 and openings 1074. After dust is separated from the air via the filter 1088, the clean air is exhausted. In some embodiments, the filter 1088 is a high efficiency particulate air ("HEPA") filter.

Figure 27:
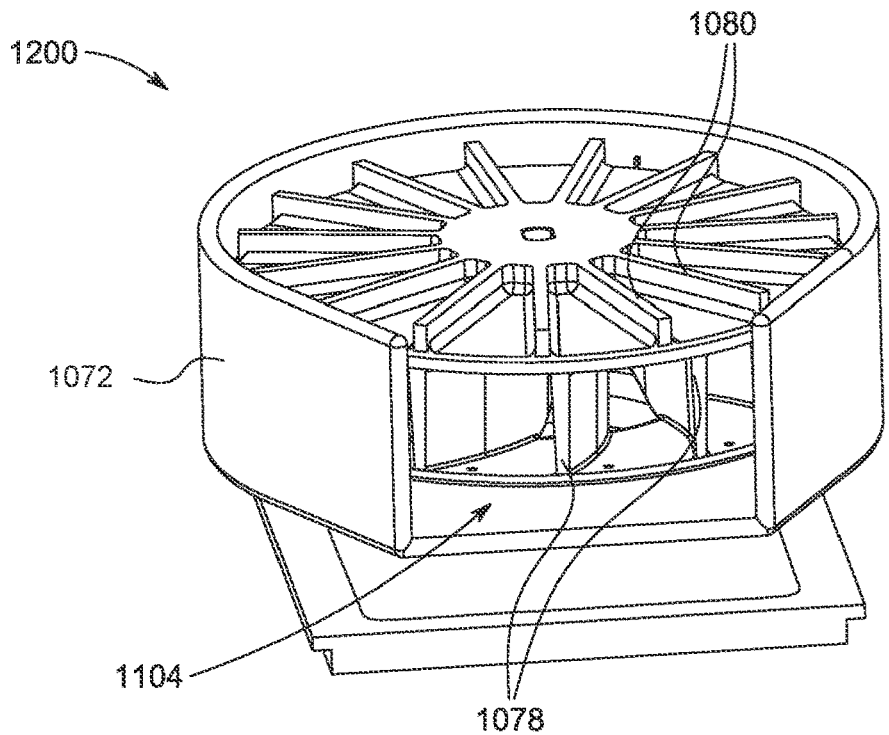
FIG. 27 is a detailed view of a fan according to one embodiment.

Accordingly, rotation of the fan 1200 simultaneously creates the suction air flow (AF1) and the cooling air flow (AF2). In the illustrated embodiment, the fan 1200 is a dual finned fan with a first set of fan blades 1078 and a second set of fan blades 1080, as best shown in FIG. 27. The first set of fan blades 1078 is used to create the suction air flow (AF1) and the second set of fan blades 1080 is used to create the cooling air flow (AF2). However, other types of fans may be used to create one or both airflows. For example, in some embodiments, a fan having a single set of fan blades may create both the suction airflow (AF1) and the cooling airflow (AF2). In some embodiments, the cooling air flow (AF2) and the dust extraction air flow (AF2) may be two separate streams of air, which are isolated from one another until merging within the fan 1200 and being exhausted together as a merged air flow stream. In some embodiments, the cooling air flow is directed over other components (e.g., circuit boards) of the rotary hammer 1004 to cool these components as well.

In some embodiments, the dust collection assembly 1008 may have additional features. For example, in the illustrated embodiment, the hall board for the motor 1048 is positioned between the motor 1048 and the fan 1200. Additionally, a bearing 1202 supporting the output shaft of the motor 1048 is also disposed between the motor 1048 and the fan 1200 so that the cooling air flow travels over the bearing 1202. This arrangement allows air from the suction air flow to move from the dust tube 1040 into the filter 1088 and through the fan 1200 without having to be guided around any bearings. Furthermore, this arrangement causes the cooling air to cool the motor 1048 and/or the fan to move through the stator of the motor 1048 and guided around the bearing support structure before reaching the fan 1200.

The dust collection assembly 1008 may further include a filter cleaning mechanism 1148 (FIG. 23), which clears dust off of the filter 1088. In one embodiment, the filter cleaning mechanism 1148 includes a solenoid 1082, which is activated to extend a pin 1086. The pin 1086, in turn, engages an anvil 1090, which rotates to knock on the filter 1088 and release debris. As mentioned above, the controller 1205 is adapted to operate the dust collection assembly 1008 and the drive unit 1044. This allow for coordination between both assemblies. In one embodiment, the filter cleaning mechanism 1148 is automatically actuated when the fan 1200 transitions from an active state to an inactive state. In another embodiment, the filter cleaning mechanism 1148 is automatically actuated when the motor 1048 transitions from an active state to an inactive state. As used herein, the fan 1200 transitions from the active state to the inactive state when the fan 1200 stops rotating, or when the fan 1200 slows to a rotational speed below a predetermined threshold such that the airflow induced by the fan 1200 has effectively stopped. The controller 1205 may monitor an indicator of the rotational state of the fan 1200. In some embodiments, the controller 1205 may be configured to monitor the rotation of the fan 1200 by using a Hall-effect sensor for directly detecting the rotational speed of the fan 1200 (e.g., by using a magnet that rotates with the fan 1200). In another embodiment, the fan 1200 transitions from the active state to the inactive state when the motor 1048 is no longer transmitting a rotational force to the fan 1200. Similarly, the motor 1048 can transition from an active state to an inactive state when the motor 1048 stops rotating or when the motor 1048 slows to a predetermined threshold of rotational speed. For example, the controller 1205 may monitor a sensor that detects the voltage or current applied to the motor 1048 to determine whether the motor 1048 has transitioned from the active state (i.e., providing torque to the fan 1200) to the inactive state.

Figure 28:
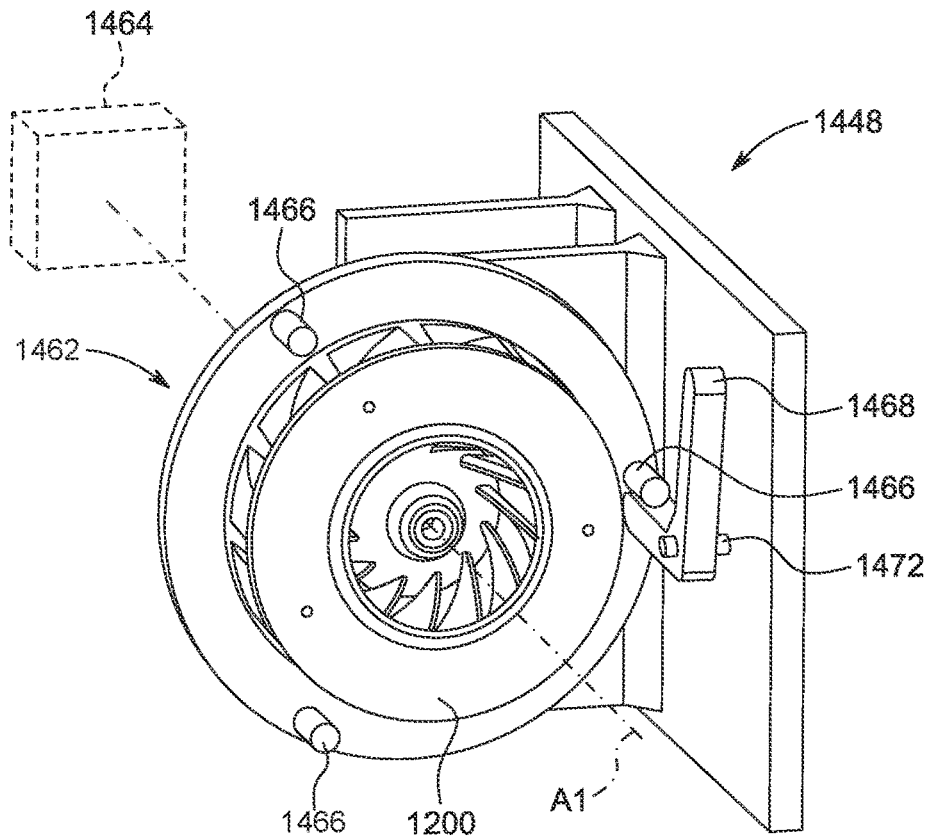
FIG. 28 is a detailed view of a fan and filter cleaning mechanism according to one embodiment.

FIG. 28 provides another embodiment of a filter cleaning mechanism 1448. In the illustrated embodiment, the filter cleaning mechanism 1448 includes an actuator in in the form of a clutch bearing 1464 (i.e., a one-way bearing) located between the shaft of the motor 1048 and a rotatable plate 1462 having a plurality of cogs 1466. Under normal operation, the motor 1048 and the fan 1200 rotate about the rotational axis A1 in a first direction (i.e., in a counter clockwise direction in FIG. 28). When rotating in the first direction, the torque from the motor 1048 is not transferred to the plate 1462. However, once the fan 1200 transitions from the active state to the inactive state (i.e., slows to a stop or slows to below a predetermined threshold speed), the motor 1048 is configured to pulse in a second, or a reverse direction (i.e., in a clockwise direction in FIG. 28). Due to the effect of the clutch bearing 1464, torque is transferred to the plate 1462 when the motor 1048 pulses in the reverse direction. The cogs 1466 extending from the plate 1462 sequentially engage a linkage 1468, which in turn, impacts the filter 1088. In the illustrated embodiment, the linkage 1468 rotates about a pivot 1472.

The integration of the dust collection assembly 1008 within the rotary hammer 1004 may provide a number of different benefits. For example, the integration of the dust collection assembly 1008 within the rotary hammer 1004 may allow for a reduced number of parts for the operation of the rotary hammer 1004 and dust collection assembly 1008. This may in turn reduce the overall cost of the system. Additionally, in some embodiments, the reduction of parts may also reduce the overall weight and size of the system. Likewise, in some embodiments, the profile of the tool system is more compact, which may allow a user to more easily maneuver and hold the tool system. It should be understood that the various features and embodiments described in the present disclosure may be mixed together or interchanged into different combinations of features and embodiments.

For example, the disclosed rotary hammer 1004 utilizes a single power source (e.g., the battery 1056) and a single electric motor 1048 to operate the drive assembly 1052 and the dust collection assembly 1008. Furthermore, the rotary hammer 1004 includes a single controller adapted to control operation of the drive assembly 1052 and the dust collection assembly 1008. Additionally, a single fan 1200 may be used to generate two distinct air flow paths, including a suction air flow path and a cooling air flow path. The first air flow path is the dust collector flow path in which dust laden air enters through a the nozzle 1076, travels through the dust tube 1040, into the exterior and interior transfer tubes 1140, 1141, and deposits the dust with the help of the filter 1088 into the dust container 1084. The air flow in the dust collector flow path is driven by the fan 1200 and the motor 1048. The second flow path is characterized as a cooling flow path, which directs clean air over the motor 1048 and/or the controller 1205, or other components of the drive assembly to cool these components.

In some embodiments, the rotary hammer 1004 is compatible with ONE-KEY®. In particular, the rotary hammer 1004 is capable of wireless communication (e.g., using Bluetooth or other nearfield communication protocol), thereby allowing the rotary hammer 1004 to be monitored and/or controlled via a remote device (e.g., a smartphone). When wirelessly connected to the remote device, it is possible for the remote device to track a location of the rotary hammer 1004, monitor the battery 1056, remotely lock the trigger 1098, and control other aspects of the rotary hammer 1004. For example, a user can control or adjust the rotational speed and/or torque output of the motor 1048. Likewise, a user can adjust other operational settings of the tool. In some embodiments, the ONE-KEY electronics are incorporated within the controller 1205. However, in other embodiments, the ONE-KEY electronics may be provided through a separate controller PCB.

While multiple embodiments of a rotary hammer have been described above, it will be understood by one of ordinary skill in the art that the various features and components of the described embodiments are interchangeable. Furthermore, although the disclosure has been described in detail with reference to certain preferred embodiments, variations and modifications exist within the scope and spirit of one or more independent aspects of the disclosure as described.

Various features of the disclosure are set forth in the following claims.

What is claimed is:

1. A handheld power tool comprising:
    a housing;
    a tool receptacle disposed on a first end of the housing and configured to receive a tool accessory;
    a motor positioned within the housing and operatively coupled to the tool receptacle to drive the tool accessory;
    a dust container selectively coupled to the housing of the power tool;
    a dust tube coupled to the first end of the housing and in fluid communication with the dust container, the dust tube movable between an extended position and a retracted position; and
    a fan positioned within the housing and operable to generate a suction air flow path through the dust tube and into the dust container, the fan rotatably driven by the motor.

2. The handheld power tool of claim 1, wherein the fan is operable to generate a cooling air flow path through the housing, the cooling air flow path passing over at least one of the motor and a controller to provide a cooling effect.

3. The handheld power tool of claim 2, wherein the suction air flow path and the cooling air flow path and isolated from one another until they reach the fan.

4. The handheld power tool of claim 2, wherein the suction air flow path and the cooling air flow path enter the fan along a rotation axis of the fan from two opposing directions, and wherein the suction air flow path and the cooling air flow path exit the fan in a radial direction.

5. The handheld power tool of claim 1, further comprising a filter positioned within the housing, the filter in fluid communication with the fan to draw dust laden air through the filter.

6. The handheld power tool of claim 5, wherein the fan is positioned between the motor and the filter, and wherein the motor, the fan, and the filter are aligned along a motor axis, and wherein a rotational axis of the fan is coaxial with the motor axis.

7. The handheld power tool of claim 5, further comprising a filter cleaning mechanism positioned within the housing, the filter cleaning mechanism configured to remove debris trapped in the filter.

8. The handheld power tool of claim 7, further comprising a controller positioned within the housing, the controller configured to control the motor and the filter cleaning mechanism.

9. The handheld power tool of claim 1, further comprising a dust transfer tube arranged between the dust tube and the dust container to transfer dust from the dust tube to the dust container, the dust transfer tube extending through at least a portion of the housing.

10. The handheld power tool of claim 1, wherein the tool accessory defines a first axis, the motor defines a second axis, and wherein the first axis is angled relative to the second axis.

11. The handheld power tool of claim 10, wherein the angle between the first axis and the second axis is between 80 and 135 degrees.

12. The handheld power tool of claim 11, wherein the angle between the first axis and the second axis is 90 degrees.

13. A handheld power tool comprising:
    a housing;
    a tool receptacle disposed on a first end of the housing and configured to receive a tool accessory;
    a motor positioned within the housing and operatively coupled to the tool receptacle to drive the tool accessory;
    a dust container selectively coupled to the housing;

an over-bit dust tube coupled to the first end of the housing and in fluid communication with the dust container, the over-bit dust tube movable between an extended position and a collapsed position; and
a fan positioned within the housing and operable to generate an air flow path through the dust tube and into the dust container.

14. The handheld power tool of claim 13, wherein the over-bit dust tube is removably coupled to the housing.

15. The handheld power tool of claim 14, wherein the over-bit dust tube is removably coupled to the housing via at least one of a snap fit and a rotatable connection.

16. The handheld power tool of claim 15, further comprising a dust transfer tube configured to selectively couple the over-bit dust tube to the housing, and wherein the dust transfer tube is axially secured to the housing via a snap fit connection, and wherein the dust transfer tube is rotationally secured to the housing via a rotatable connection.

17. A handheld power tool comprising:
a housing;
a tool receptacle disposed on a first end of the housing and configured to receive a tool accessory, the tool accessory defining a working axis;
a handle extending rearward from a second end of the housing;
a motor positioned within the housing and operatively coupled to the tool receptacle to drive the tool accessory;
a dust container selectively coupled to the housing;
a dust tube coupled to the first end of the housing and in fluid communication with the dust container, the dust tube movable between an extended position and a retracted position;
a dust transfer tube fluidly connecting the dust tube and the dust container, the dust transfer tube extending through at least a portion of the housing; and
a fan positioned within the housing and operable to generate a suction air flow path through the dust tube and into the dust container.

18. The handheld power tool of claim 17, further comprising an auxiliary handle removably coupled to a rear end of the power tool.

19. The handheld power tool of claim 18, wherein the auxiliary handle extends along a direction generally parallel to the working axis.

20. The handheld power tool of claim 19, further comprising a trigger operatively coupled to the motor to actuate the motor, the trigger disposed along the handle in a position proximate the working axis whereby the tool accessory, the trigger, and the auxiliary handle are aligned.

21. The handheld power tool of claim 18, wherein the auxiliary handle is at least one of extendable to different lengths or rotatable to different orientations relative to the housing.

* * * * *